US007226985B2

(12) United States Patent
Hale et al.

(10) Patent No.: US 7,226,985 B2
(45) Date of Patent: Jun. 5, 2007

(54) POLYESTER-POLYCARBONATE COMPOSITIONS

(75) Inventors: Wesley Raymond Hale, Kingsport, TN (US); David Gayle Salyer, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 16 days.

(21) Appl. No.: 11/179,428

(22) Filed: Jul. 12, 2005

(65) Prior Publication Data
US 2007/0015883 A1   Jan. 18, 2007

(51) Int. Cl.
C08G 63/00 (2006.01)
(52) U.S. Cl. .................. 528/272; 422/411.1; 422/412; 525/67; 525/68; 525/69; 525/166; 525/437; 525/439; 528/271
(58) Field of Classification Search ............. 422/411.1, 422/412; 525/67, 68, 69, 166, 437, 439; 528/271, 272
See application file for complete search history.

(56) References Cited

U.S. PATENT DOCUMENTS

| | | | |
|---|---|---|---|
| 3,030,335 A | 4/1962 | Goldberg |
| 3,169,121 A | 2/1965 | Goldberg |
| 3,207,814 A | 9/1965 | Goldberg |
| 3,317,466 A | 5/1967 | Caldwell et al. |
| 3,541,059 A | 11/1970 | Schaper |
| RE27,682 E | 6/1973 | Schnell et al. |
| 3,772,405 A | 11/1973 | Hamb |
| 3,799,953 A | 3/1974 | Freitag et al. |
| 3,907,754 A | 9/1975 | Tershansy et al. |
| 3,962,189 A | 6/1976 | Russin et al. |
| 4,001,184 A | 1/1977 | Scott |
| 4,001,884 A | 1/1977 | Herbst et al. |
| 4,010,145 A | 3/1977 | Russin et al. |
| 4,156,069 A | 5/1979 | Prevorsek et al. |
| 4,185,009 A | 1/1980 | Idel et al. |
| 4,194,038 A | 3/1980 | Baker et al. |
| 4,352,907 A | 10/1982 | Lee |
| 4,356,299 A | 10/1982 | Cholod et al. |
| 4,367,186 A | 1/1983 | Adelmann et al. |
| 4,430,484 A | 2/1984 | Quinn |
| 4,431,793 A | 2/1984 | Rosenquist |
| 4,452,933 A | 6/1984 | McCready |
| 4,465,820 A | 8/1984 | Miller et al. |
| 4,469,861 A | 9/1984 | Mark et al. |
| 4,749,773 A | 6/1988 | Weaver et al. |
| 4,786,692 A | 11/1988 | Allen et al. |
| 4,826,903 A | 5/1989 | Weaver et al. |
| 4,845,188 A | 7/1989 | Weaver et al. |
| 4,882,412 A | 11/1989 | Weaver et al. |
| 4,892,922 A | 1/1990 | Weaver et al. |
| 4,892,923 A | 1/1990 | Weaver et al. |
| 4,981,898 A | 1/1991 | Bassett |
| 5,017,680 A | 5/1991 | Sublett |
| 5,034,457 A | 7/1991 | Serini et al. |
| 5,104,723 A | 4/1992 | Freitag et al. |
| 5,142,088 A | 8/1992 | Phelps et al. |
| 5,191,038 A | 3/1993 | Krabbenhoft et al. |
| 5,290,631 A | 3/1994 | Fleury et al. |
| 5,654,347 A | 8/1997 | Khemani et al. |
| 5,668,243 A | 9/1997 | Yau et al. |
| 5,681,918 A | 10/1997 | Adams et al. |
| 5,696,176 A | 12/1997 | Khemani et al. |

(Continued)

FOREIGN PATENT DOCUMENTS

| | | |
|---|---|---|
| DE | 19727709 | 1/1999 |
| EP | 0 273 144 | 7/1988 |
| EP | 0 857 749 A1 | 8/1998 |
| JP | 09-059371 | 4/1997 |
| WO | WO 2004/078838 A1 | 9/2004 |

OTHER PUBLICATIONS

L. Bohn, "Polymer Handbook," 2nd Ed., 1975, pp. 111-211, Wiley Interscience, New York.
J. MacKnight et al., "Polymer Blends," vol. I, 1978, p. 185, Academic Press, New York.
Elias, H., "Macromolecules," Plenum Press: NY, 1977, p. 391.

(Continued)

Primary Examiner—Terressa Boykin
(74) Attorney, Agent, or Firm—B. J. Boshears; Bernard J. Graves, Jr.

(57) ABSTRACT

Disclosed are polymer compositions comprising: (A) a first component comprising about 1 to 99 percent by weight at least one polyester (A) comprising: (1) diacid residues selected from the group consisting of terephthalic acid residues, isophthalic acid residues and mixtures thereof, and (2) diol residues selected from the group consisting of 1,4-cyclohexanedimethanol residues, ethylene glycol residues and mixtures thereof; wherein the molar ratio of 1,4-cyclohexanedimethanol to ethylene glycol is less than 0.50; (B) a second component comprising about 99 to 1 percent by weight of a miscible blend of: (1) at least one polycarbonate (B) of bisphenol A (2) at least one polyester (C) comprising (a) diacid residues selected from the group consisting of terephthalic acid residues, isophthalic acid residues and mixture thereof, and (b) diol residues selected from the group consisting of 1,4-cyclohexanedimethanol residues, ethylene glycol residues, and mixtures thereof; wherein the molar ratio of 1,4-cyclohexanedimethanol to ethylene glycol is 0.50 or greater; and, wherein the total weight percent for the first component and for the second component is equal to 100 weight percent; and wherein the total weight percent for the second component of polycarbonate (B) and polyester (C) is equal to 100 weight percent; and wherein the first component and second component have refractive indices which differ in absolute value by 0.008 or less; and wherein the total mole percent of the diacid residues of each of polyesters (A) and polyester (C) individually is equal to 100 mole percent; and wherein the total mole percent of the diol residues of each of polyesters (A) and polyester (C) individually is equal to 100 mole percent.

65 Claims, No Drawings

U.S. PATENT DOCUMENTS

| | | | |
|---|---|---|---|
| 5,907,026 | A | 5/1999 | Factor et al. |
| 6,225,436 | B1 | 5/2001 | Eiffler et al. |
| 6,307,006 | B1 | 10/2001 | Konig et al. |
| 6,323,304 | B1 | 11/2001 | Lemmon et al. |
| 6,448,334 | B1 | 9/2002 | Verhoogt et al. |
| 6,504,002 | B1 | 1/2003 | Karlik et al. |
| 2003/0187151 | A1* | 10/2003 | Adams et al. ............ 525/439 |

OTHER PUBLICATIONS

"Polymer Blends," vol. 1, Chapters 2, 9, 10, 11 and 17, and vol. 2, Chapters 23 and 28, 2000, Edited by D. R. Paul and C. B. Bucknell, John Wiley & Sons, Inc.

"Plastic Additives Handbook," 5th Edition, 2001, pp. 98-108 and pp. 109-112 (Hanser Gardner Publications, Inc., Cincinnati, OH.

J. Kerns Sears and Joseph R. Darby, "The Technology of Plasticizers," 1982, pp. 136-137, Society of Plastic Engineers/Wiley and Sons, NY.

"Mixing and Compounding of Polymers," 1994, Chapters 1-5 and 18-23, I. Manas-Zloczower & Z. Tadmor editors, Carl Hanser Verlag Publisher, New York, NY.

Biangardi et al., Die Angew, Makromole. Chemie, 183, 221 (1990).

Coleman et al., "Polymer," 31, 1187 (1990).

T. G. Fox, Am. Phys. Soc., 1, 123 (1956).

* cited by examiner

POLYESTER-POLYCARBONATE COMPOSITIONS

FIELD OF THE INVENTION

This invention relates to compositions of (1) certain polyesters from diacid residues selected from terephthalic acid, isophthalic acid or mixtures thereof, diol residues selected from 1,4-cyclohexanedimethanol, ethylene glycol, or mixtures thereof; with miscible blends of (2) polycarbonates of bisphenol A, and (3) other polyesters from diacid residues selected from terephthalic acid, isophthalic acid or mixtures thereof, diol residues selected from 1,4-cyclohexanedimethanol, ethylene glycol, or mixtures thereof.

BACKGROUND OF INVENTION

The polycarbonate of 4,4'-isopropylidenediphenol (bisphenol A polycarbonate) is a well known engineering molding plastic. Bisphenol A polycarbonate is a clear high-performance plastic having good physical properties such as dimensional stability, high heat resistance, and good impact strength. Although bisphenol A polycarbonate has many good physical properties, its relatively high melt viscosity leads to poor melt processability and the polycarbonate exhibits poor chemical resistance.

Blends of the polycarbonates of bisphenol A and various dihydroxydiphenyl cycloalkanes have been used in making plastic films, molded articles, and extruded articles. These polycarbonate blends are especially useful in the performance plastics industry because they tend to have good heat resistance, high melt viscosities suitable for injection molding and extrusion, toughness, and good chemical resistance.

U.S. Pat. No. 5,034,457 discloses blends of dihydroxydiphenyl cycloalkane polycarbonates with a mixture of amorphous thermoplastics, partly crystalline thermoplastics, and rubber used for injection molding. U.S. Pat. No. 5,104,723 discloses blends of dihydroxydiphenyl cycloalkane polycarbonates with amorphous thermoplastics, partially crystalline thermoplastics, and elastomers for the production of films.

However, there has been no disclosure of miscible blends of dihydroxydiphenyl cycloalkane polycarbonates with other materials. Immiscible blend compositions are inadequate for many uses because they are opaque, and generally result in an unacceptable reduction in impact strength and tensile strength.

There have been very few clear polycarbonate/polyester blends developed. These polyester blends do have improved chemical resistance and melt processability, when compared to unblended bisphenol A polycarbonate. However, the presence of the bisphenol A polycarbonate in these miscible blend reduces the chemical resistance of the polyester.

The vast majority of two-phase polymer blends form articles, which are visually opaque and thus, cannot be used in applications where clarity is useful. It is unusual to find blends of two polymers which form two-phase materials in the solid state and which are also visually clear.

Refractive indices of polymers vary over a broad range. For instance, many polymers have refractive indices in the range of 1.35 to 1.65 It is exceptional to find a pair of polymers where the refractive index difference is similar so that visually clear blends of the two immiscible components are formed.

It is known that the matching of refractive indices of polymer pairs can result in visually clear articles of the blends of the two polymers. L. Bohn, Polymer Handbook, 2nd ed., pp. 111-211, Wiley Interscience, New York ((1975); J. MacKnight et al., Polymer Blends, Vol. I, p. 185, Academic Press, New York (1978). Biangardi et al., Die Angew. Makromole. Chemie, 183, 221 (1990), have developed model calculations which quantify this phenomena and evaluate the light scattering of certain blends as a function of particle diameter, refractive index, wavelength, and particle structure.

There is a need in the art for visually clear or miscible, two-phase blends, which are particularly useful in applications requiring rigid high temperature resistant materials and chemical resistance.

SUMMARY OF THE INVENTION

This invention relates to compositions of (1) certain polyesters from diacid residues selected from terephthalic acid, isophthalic acid or mixtures thereof, diol residues selected from 1,4-cyclohexanedimethanol, ethylene glycol, or mixtures thereof; and miscible blends of (2) polycarbonates of bisphenol A, and (3) other polyesters from diacid residues selected from terephthalic acid, isophthalic acid or mixtures thereof, diol residues selected from 1,4-cyclohexanedimethanol, ethylene glycol, or mixtures thereof.

More particularly, in a first embodiment, this invention relates to a polymer composition comprising:
  (A) a first component comprising about 1 to 99 percent by weight at least one polyester (A) comprising:
    (1) diacid residues selected from the group consisting of terephthalic acid residues, isophthalic acid residues and mixtures thereof, and
    (2) diol residues selected from the group consisting of 1,4-cyclohexanedimethanol residues, ethylene glycol residues and mixtures thereof;
    wherein the molar ratio of 1,4-cyclohexanedimethanol to ethylene glycol is less than 0.50;
  (B) a second component comprising about 99 to 1 percent by weight of a miscible blend of:
    (1) at least one polycarbonate (B) of bisphenol A
    (2) at least one polyester (C) comprising
      (a) diacid residues selected from the group consisting of terepthalic acid residues, isophthalic acid residues and mixture thereof, and (b) diol residues selected from the group consisting of 1,4-cyclohexanedimethanol residues, ethylene glycol residues, and mixtures thereof;
      wherein the molar ratio of 1,4-cyclohexanedimethanol to ethylene glycol is 0.50 or greater; and,
    (3) optionally, at least one salt (D) prepared by the reaction of one or more acidic phosphorus-containing compounds with one or more basic organic compounds which contain nitrogen;
    wherein the total weight percent for the second component of polycarbonate (B) and polyester (C) is equal to 100 weight percent; and
    wherein the total weight percent for the first component and for the second component is equal to 100 weight percent; and
    wherein the first component and second component have refractive indices which differ in absolute value by 0.008 or less; and
    wherein the total mole percent of the diacid residues of each of polyesters (A) and polyester (C) individually is equal to 100 mole percent; and
    wherein the total mole percent of the diol residues of each of polyesters (A) and polyester (C) individually is equal to 100 mole percent.

A second embodiment of the present invention is a polymer composition comprising:
(A) a first component comprising about 5 to 50 percent by weight at least one polyester (A) comprising:
  (1) diacid residues selected from the group consisting of terephthalic acid residues, isophthalic acid residues and mixtures thereof; and
  (2) diol residues selected from 1,4-cyclohexanedimethanol residues, ethylene glycol residues and mixtures thereof; and
  wherein the molar ratio of 1,4-cyclohexanedimethanol to ethylene glycol is less than 0.50;
(B) a second component comprising about 50 to 95 percent by weight of a miscible blend of:
  (1) at least one polycarbonate (B) of bisphenol A;
  (2) at least one polyester (C) comprising
    (a) diacid residues selected from the group consisting of terepthalic acid residues, isophthalic acid residues and mixtures thereof; and
    (b) diol residues selected from the group consisting of 1,4-cyclohexanedimethanol residues, ethylene glycol residues and mixtures thereof,
    wherein the molar ratio of 1,4-cyclohexanedimethanol to ethylene glycol is 0.50 or greater; and,
  (3) optionally, at least one salt (D) prepared by the reaction of one or more acidic phosphorus-containing compounds with one or more basic organic compounds which contain nitrogen;
  wherein the total weight percent for the first component and for the second component is equal to 100 weight percent;
  wherein the total weight percent for the second component of polycarbonate (B) and polyester (C) is equal to 100 weight percent;
  wherein the first component and second component have refractive indices which differ in absolute value by 0.008 or less;
  wherein the total mole percent of the diacid residues of each of polyesters (A) and polyester (C) individually is equal to 100 mole percent; and
  wherein the total mole percent of the diol residues of each of polyesters (A) and polyester (C) individually is equal to 100 mole percent.

A third embodiment of the present invention is a polymer composition comprising:
(A) a first component comprising about 10 to 40 percent by weight at least one polyester (A) comprising (1) 80 to 100 mole percent of terephthalic acid residues and 0 to 20 mole percent of isophthalic acid; and (2) 0 to 35 mole percent of 1,4-cyclohexanedimethanol residues and 65 to 100 mole percent of ethylene glycol residues;
(B) a second component comprising about 60 to 90 percent by weight of a blend of:
  (1) at least one polycarbonate (B) of bisphenol A
  (2) at least one polyester (C) comprising 50 to 85 mole percent 1,4-cyclohexanedimethanol residues and 15 to 50 mole percent ethylene glycol residues;
  (3) optionally, at least one salt (D) prepared by the reaction of one or more acidic phosphorus-containing compounds with one or more basic organic compounds which contain nitrogen;
  wherein the total weight percent for the second component of polycarbonate (B) and polyester (C) is equal to 100 weight percent; and
  wherein the total weight percent for the first component and for the second component is equal to 100 weight percent;
  wherein the first component and second component have refractive indices which differ in absolute value by 0.008 or less;
  wherein the total mole percent of the diacid residues of each of polyesters (A) and polyester (C) individually is equal to 100 mole percent; and
  wherein the total mole percent of the diol residues of each of polyesters (A) and polyester (C) individually is equal to 100 mole percent.

In all of the embodiments of the invention, the second component of the polymer composition of the invention may comprise at least one salt (D) prepared from the reaction of one or more acidic phosphorus-containing compounds and one or more basic organic compounds which contain nitrogen.

Also, in all of the embodiments of the invention, the first component and second component of the polymer composition of the invention have refractive indices which differ in absolute value by 0.008 or less, preferably, 0.006 or less, more preferably, 0.004 or less.

A fourth embodiment of the invention relates to a method for producing the polymer composition of the invention comprising the steps of:
  (a) blending polycarbonate (B) and polyester (C) and optionally, salt (D), to form the second component;
  (b) blending said first component with the second component;
  (c) before, during or after the blending of the first component with the second component, melting the first component and the second component to form after the blending and melting, a melt blend; and
  (d) cooling the melt blend to form a clear blend composition.

A fifth embodiment of the invention relates to a method for producing the polymer composition of the invention comprising the steps of:
  (a) blending polyester (A), polycarbonate (B) and polyester (C) and optionally, salt (D);
  (b) melting the blend of (a) to form after the blending and melting, a melt blend; and
  (d) cooling the melt blend to form a clear blend composition.

An sixth embodiment of the invention relates to a process for the manufacture of film or sheet comprising the steps of extruding or calendering the polymer composition of the invention. The film or sheet produced from this process have at least one layer but can have two or more layers. The first and second component of the polymer composition of the invention may be present in separate layers.

The invention also includes molded or formed articles, film, sheet, and/or fibers comprising the polymer compositions of the invention which may be formed by any conventional method known in the art as well as a process for making such articles, film, sheet, and/or fibers comprising the steps of injection molding, extrusion blow molding, film/sheet extruding or calendering the polymer blend(s).

Surprisingly, the present invention provides polymer blends that exhibit an improved combination of at least two properties such as clarity and miscibility as well as good dimensional stability, good high heat resistance and good Izod impact strength.

DETAILED DESCRIPTION OF THE INVENTION

This invention relates to a polymer composition comprising:

(A) a first component comprising about 1 to 99 percent by weight at least one polyester (A) comprising:
  (1) diacid residues selected from the group consisting of terephthalic acid residues, isophthalic acid residues and mixtures thereof, and
  (2) diol residues selected from the group consisting of 1,4-cyclohexanedimethanol residues, ethylene glycol residues and mixtures thereof;
  wherein the molar ratio of 1,4-cyclohexanedimethanol to ethylene glycol is less than 0.50;
(B) a second component comprising about 99 to 1 percent by weight of a miscible blend of:
  (1) at least one polycarbonate (B) of bisphenol A
  (2) at least one polyester (C) comprising
    (a) diacid residues selected from the group consisting of terepthalic acid residues, isophthalic acid residues and mixture thereof, and (b) diol residues selected from the group consisting of 1,4-cyclohexanedimethanol residues, ethylene glycol residues, and mixtures thereof;
    wherein the molar ratio of 1,4-cyclohexanedimethanol to ethylene glycol is 0.50 or greater; and,
  (3) optionally, at least one salt (D) prepared by the reaction of one or more acidic phosphorus-containing compounds with one or more basic organic compounds which contain nitrogen.;
  wherein the first component and second component have refractive indices which differ in absolute value by 0.008 or less.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint (s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The term "polyester", as used herein, is intended to include "copolyesters" and is understood to mean a synthetic polymer prepared by the polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. The term "residue", as used herein, means any organic structure incorporated into a polymer or plasticizer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The polyester(s) (A) and polyester(s) (C) included in the present invention each contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a polyester containing 20 mole % isophthalic acid, based on the total acid residues, means the polyester contains 20 mole % isophthalic acid residues out of a total of 100 mole % acid residues. Thus, there are 20 moles of isophthalic acid residues among every 100 moles of acid residues. In another example, a polyester containing 10 mole % ethylene glycol, based on the total diol residues, means the polyester contains 10 mole % ethylene glycol residues out of a total of 100 mole % diol residues. Thus, there are 10 moles of ethylene glycol residues among every 100 moles of diol residues.

For the polyester compositions of the invention, the total weight percent for the first component and the second component is equal to 100 weight percent; and the total weight percent for the second component of polycarbonate (B) and polyester (C) is equal to 100 weight percent.

The first and second component of the invention of the compositions of the inventions have refractive indices which differ in absolute value by 0.008 or less, preferably, 0.006 or less and more preferably, 0.004 or less.

The copolyesters useful in the invention as polyster(s) (A) and polyester(s) (C) include but are not limited to amorphous copolyesters. Copolyesters that are semi-crystalline can be formed into clear amorphous products by rapid cooling from the melt state. Amorphous copolyesters are generally defined as copolyesters that do not show a substantial melting point by differential scanning calorimetry when scanned at a rate of 20° C./min. Another way of defining the term "amorphous copolyester" is generally defined as a copolyester that has a crystallization half time from a molten state of at least 5 minutes: The crystallization half time may be, for example, at least 7 minutes, at least 10 minutes, at least 12 minutes, at least 20 minutes, and at least 30 minutes. The crystallization half time of the polyester, as used herein, may be measured using methods well-known to persons of skill in the art. For example, the crystallization half time may be measured using a Perkin-Elmer Model DSC-2 differential scanning calorimeter. The crystallization half time is measured from the molten state using the following procedure: a 15.0 mg sample of the polyester is sealed in an aluminum pan and heated to 290° C. at a rate of about 320° C./min for 2 minutes. The sample is then cooled immediately to the predetermined isothermal crystallization temperature at a rate of about 320° C./minute in the presence of helium. The isothermal crystallization temperature is the temperature between the glass transition temperature and the melting temperature that gives the highest rate of crystallization. The isothermal crystallization temperature is described, for example, in Elias, H. Macromolecules, Plenum Press: NY, 1977, p 391. The crystallization half time is determined as the time span from reaching the isothermal crystallization temperature to the point of a crystallization peak on the DSC curve.

The polymer compositions of the invention comprise a first component of a polyester or miscible blend of polyesters, and a second component which is a miscible blend of comprising polyester and polycarbonate, wherein a blend of the first and second components form a clear immiscible blend. The term "miscible" as used herein, is intended to mean that the blend has a single, homogeneous amorphous phase as indicated by a single composition-dependent Tg (glass transition temperature) as measured by well-known techniques such as, for example, differential scanning calorimetry ("DSC"). By contrast, the term "immiscible", as used herein, denotes a blend that shows at least 2 phases and exhibits more than one Tg. A further general description of miscible and immiscible polymer blends and the various analytical techniques for their characterization may be found in *Polymer Blends*, Volumes 1 and 2, Edited by D. R. Paul and C. B. Bucknall, 2000, John Wiley & Sons, Inc. The desired crystallization kinetics from the melt also may be achieved by the addition of polymeric additives such as, for example, plasticizers, or by altering the molecular weight characteristics of the polymer. The polyesters (A) and (C) utilized in the present invention are amorphous and have glass transition temperatures of about 40 to 140° C., preferably about 60 to 100° C. The polyesters (A) and (C) typically have an inherent viscosity (I.V.) of about 0.3 to 1.2 dL/g, preferably about 0.6 to 1.1 dL/g. For polyester (C), one embodiment is a polyster having an inherent viscosity of at least 0.5 dL/g, preferably at least 0.7 dL/g. As used herein, I.V. refers to inherent viscosity determinations made at 25° C. using 0.50 gram of polymer per 100 mL of a solvent composed of 60 weight percent phenol and 40 weight percent tetrachloroethane. The basic method of determining the I.V. of the polyesters herein is set forth in ASTM method D2857-95.

The diacids (dicarboxylic acids) useful in the first component of the invention, polyester (A) of the present invention may comprise from about 70 to 100 mole percent, preferably 80 to 100 mole percent, more preferably, 90 to 100 mole percent, even more preferably, 95 to 100 mole percent, of phthalic acid residues, for example, terephthalic acid residues, isophthalic acids, and/or mixtures thereof. Terephthalic acid is a preferred embodiment. For example, the polyester may comprise about 70 to about 100 mole % of diacid residues from terephthalic acid and 0 to about 30 mole % diacid residues from isophthalic acid (in one embodiment, about 0.1 to 30 mole percent isophthalic acid). In another example, the polyester may comprise about 70 to about 99.9 mole % of diacid residues from terephthalic acid and 0.1 to about 30 mole % diacid residues from isophthalic acid.

Polyester (A) of the first component of the compositions of the invention also may further comprise from about 0 to about 30 mole percent, preferably 0 to 10 mole percent of modifying diacids. Examples of modifying diacids for polyester (A) that may be used include but are not limited to aliphatic dicarboxylic acids, alicyclic dicarboxylic acids, aromatic dicarboxylic acids (other than terephthalic acid and isophthalic acid), or mixtures of two or more of these acids. Specific examples of modifying dicarboxylic acids include, but are not limited to, one or more of succinic acid, glutaric acid, adipic acid, suberic acid, sebacic acid, azelaic acid, dimer acid, sulfoisophthalic acid. Additional examples of modifying diacids are fumaric, maleic, itaconic, 1,3-cyclohexanedicarboxylic, diglycolic, 2,5-norbornanedicarboxyclic, phthalic acid, diphenic, 4,4'-oxydibenzoic, and 4,4'-sulfonyldibenzoic.

Other examples of modifying dicarboxylic acid residues include but are not limited to naphthalenedicarboxylic acid and 1,4-cyclohexanedicarboxylic acid. Any of the various isomers of naphthalenedicarboxylic acid or mixtures of isomers may be used, but the 1,4-, 1,5-, 2,6-, and 2,7-isomers are preferred. Cycloaliphatic dicarboxylic acids such as, for example, 1,4-cyclohexanedicarboxylic acid may be present at the pure cis or trans isomer or as a mixture of cis and trans isomers. Dicarboxylic acids having 2 to 20 carbon atoms, preferably 2 to 18 carbon atoms, and more preferably, 2 to 16 carbon atoms, are included in one embodiment of the invention. In one embodiment, mixtures of terephthalic acid and 1,4-cyclohexanedicarboxylic acid are preferred.

In an embodiment of this invention, polyester (A) of the first component of the polymer compositions of the invention also comprises diol residues that may comprise about 0 to about 40 mole percent, preferably 0 to about 35 mole percent, and more preferably, 0.5 to about 35 mole percent of the residues of 1,4-cyclohexanedimethanol, and about 60 to about 100 mole percent, preferably about 65 to about 100 mole percent, and more preferably, 65 to about 95.5 mole percent of ethylene glycol residues. In another embodiment, polyester (A) comprises 0.5 to 13 mole percent of 1,4-cyclohexanedimethanol and 87 to 99.95 mole percent of ethylene glycol residues. For example, in polyester (A), the diol residues may comprise about: (a) 20 to 40 mole percent, preferably, about 27 to 35 mole percent, more preferably, about 30 to 35 mole percent, of the residues of 1,4-cyclohexanedimethanol, based on the total mole percentage of diol residues equaling 100 mole percent, and (b) 60 to 80 mole percent, preferably, about 65 to 72 mole percent, more preferably, about 65 to 70 mole percent of the residues of ethylene glycol residues, based on the total mole percentage of diol residues equaling 100 mole percent.

In an embodiment of this invention, polyester (C) of the first component of the polymer compositions of the invention also comprises diol residues that may comprise about 50 to about 85 mole percent, preferably 55 to about 70 mole percent, and more preferably 58 to about 65 mole percent of the residues of 1,4-cyclohexanedimethanol, and 15 to about 50 mole percent, preferably 30 to about 55, and more preferably 35 to about 42 mole percent of ethylene glycol residues In connection with any of the described ranges for mole percentages of the diol residues present herein, any of the described mole percentages of the diacid residues may be used. In combination with the preferred ranges for the mole percentages of the diol residues stated herein, it is another embodiment of the invention that the diacid residues of polyester (A) comprise about 80 to about 100 mole percent, preferably about 90 to about 100 mole percent, and more preferably about 95 to about 100 mole percent of the residues of terephthalic acid.

The polymer compositions of the invention typically comprise from about 1 to 99 weight percent, preferably 5 to 50 weight percent, more preferably, about 10 to 40 weight percent, and even more preferably, 20 to 35 weight percent of the first component (polyester (A)), and about 99 to 1 weight percent, preferably 50 to 95 weight percent, more preferably, about 60 to 90 weight percent, and even more preferably, about 65 to 80 weight percent of the second component, where the total weight percentages of all components of the polymer composition equal 100 weight percent.

Polyester (A) and/or polyester (C) comprises from about 0 to about 10 weight percent (wt %), preferably, from about 0.05 to about 5 weight percent, more preferably, from about 0.01 to 1 weight percent, and even more preferably, 0.1 to 0.7 weight percent, based on the total weight of the polyester, of one or more residues of a branching monomer having 3 or more carboxyl substituents, hydroxyl substituents, or a combination thereof.

Examples of branching monomers include, but are not limited to, multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues comprise about 0.1 to about 0.7 mole percent of one or more residues of: trimellitic anhydride, pyromellitic dianhydride, glycerol, sorbitol, 1,2,6-hexanetriol, pentaerythritol, trimethylolethane, or trimesic acid. The branching monomer may be added to the polyester reaction mixture or blended with the polyester in the form of a concentrate as described, for example, in U.S. Pat. Nos. 5,654,347 and 5,696,176.

The 1,4-cyclohexanedimethanol residues typically may have a trans isomer content in the range of about 60 to 100%. However, a preferred isomer content is in the range of about 60 to about 80% trans isomer.

The polyesters are readily prepared by conventional methods well known in the art. For example, melt phase or a combination of melt phase and solid phase polycondensation techniques may be used if desired. The diacid residues of the polyesters may be derived from the dicarboxylic acid or a derivative of the diacid such as the lower alkyl esters, e.g., dimethyl terepthalate, acid halides, e.g., diacid chlorides, or, in some cases, anhydrides.

The polyesters present in the instant invention are readily prepared from the appropriate dicarboxylic acids, esters, anhydrides, or salts, the appropriate diol or diol mixtures, and branching monomers using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

The polyesters included in the present invention are prepared by procedures known to persons skilled in the art. The reaction of the diol, dicarboxylic acid, and branching monomer components may be carried out using conventional polyester polymerization conditions. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components and the branching monomer component. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more preferably ranging from about 220° C. to about 270°

C. This low molecular weight polymer may then be polymerized by a polycondensation reaction. Examples of the catalyst materials that may be used in the synthesis of the polyesters utilized in the present invention include titanium, manganese, zinc, cobalt, antimony, gallium, lithium, calcium, silicon and germanium. Such catalyst systems are described in U.S. Pat. Nos. 3,907,754, 3,962,189, 4,010,145, 4,356,299, 5,017,680, 5,668,243 and 5,681,918, herein incorporated by reference in their entirety. Preferred catalyst metals include titanium and manganese and most preferred is titanium. The amount of catalytic metal used may range from about 5 to 100 ppm but the use of catalyst concentrations of about 5 to about 35 ppm titanium is preferred in order to provide polyesters having good color, thermal stability and electrical properties. Phosphorus compounds frequently are used in combination with the catalyst metals and any of the phosphorus compounds normally used in making polyesters may be used. Up to about 100 ppm phosphorus typically may be used.

The term "polycarbonate" as used herein embraces those polycarbonates comprising repeating units or residues of the formula

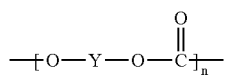

wherein Y is a divalent aromatic or aliphatic radical derived from a dihydroxyaromatic compound or a dihydroxyaliphatic compound of the formula HO—Y—OH and wherein n equals the number of repeating units. Typical dihydroxyaromatic compounds are 2,2-bis-(4-hydroxyphenyl)propane, also known as bisphenol A; bis(4-hydroxyphenyl)methane; 2,2-bis(4-hydroxy-3-methylphenyl)propane; 4,4-bis(4-hydroxyphenyl)heptane; 2,2-(3,5,3',5'-tetrachloro-4,4'-dihydroxyphenyl)propane; 2,2-(3,5,3',5'-tetrabromo-4,4'-dihydroxyphenol)propane; 3,3'-dichloro-3,3'-dichloro-4,4'-dihydroxydiphenyl)methane; 2,2'-dihydroxyphenylsulfone, and 2,2'-dihydroxyl phenylsulfide. In one embodiment, HO—Y—OH is 2,2-bis-(4-hydroxyphenyl)propyl, in which case, the polycarbonate is a "bisphenol A polycarbonate".

Examples of dihydroxyaliphatic compounds include 1,4-cyclohexane-dimethanol, 1,2-propanediol, 1,3-propanediol, 1,4-butanediol, 2,2-dimethyl-1,3-pro-panediol, 1,6-hexanediol, 2,6-decahydronaphthalenedimethanol, 1,2-cyclohexane-diol, 1,4-cyclohexanediol, 1,2-cyclohexanedimethanol, 1,3-cyclohexanedimethanol, isosorbide, 4,4'-isopropylidenedicyclohexanol, 2,2,4,4-tetramethylcyclobutane-1,2-diol, Z,8-bis(hydroxymethyl)-tricyclo-[5.2.1.0]-decane wherein Z represents 3,4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

Branched polycarbonates are also useful in the present invention. Branching is accomplished when preparing a polycarbonate; generally, a dihydric phenol, such as bisphenol A, is reacted with phosgene with the use of optional mono-functional compounds as chain terminators and tri-functional or higher functional compounds as branching or crosslinking agents. Reactive acyl halides are also condensation polymerizable and have been used in polycarbonates as terminating compounds (mono-functional), comonomers (di-functional), or branching agents (tri-functional or higher).

One method of forming branched polycarbonates, disclosed, for example, in U.S. Pat. No. 4,001,884, involves the incorporation of an aromatic polycarboxylic acid or functional derivative thereof in a conventional polycarbonate-forming reaction mixture. The examples in the '884 patent demonstrate such incorporation in a reaction in which phosgene undergoes reaction with a bisphenol, under alkaline conditions typically involving a pH above 10. Experience has shown that a preferred aromatic polycarboxylic acid derivative is trimellitic acid trichloride. Also disclosed in the aforementioned patent is the employment of a monohydric phenol as a molecular weight regulator; it functions as a chain termination agent by reacting with chloroformate groups on the forming polycarbonate chain.

U.S. Pat. No. 4,367,186 disclose a process for producing cross-linked polycarbonates wherein a cross-linkable polycarbonate contains methacrylic acid chloride as a chain terminator. A mixture of bisphenol A, aqueous sodium hydroxide, and methylene chloride is prepared. To this is added a solution of methacrylic acid chloride in methylene chloride. Then, phosgene is added, and an additional amount of aqueous sodium hydroxide is added to keep the pH between 13 and 14. Finally, the triethylamine coupling catalyst is added.

EP 273 144 discloses a branched poly(ester)carbonate which is end capped with a reactive structure of the formula —C(O)—CH=CH—R, wherein R is hydrogen or C1-3 alkyl. This polycarbonate is prepared in a conventional manner using a branching agent, such as trimellityl trichloride and an acryloyl chloride to provide the reactive end groups. According to the examples, the process is carried out by mixing water, methylene chloride, triethylamine, bisphenol A, and optionally para-t-butyl phenol as a chain terminating agent. The pH is maintained at 9 to 10 by addition of aqueous sodium hydroxide. A mixture of terephthaloyl dichloride, isophthaloyl dichloride, methylene chloride, and optionally acryloyl chloride, and trimellityl trichloride is added dropwise. Phosgene is then introduced slowly into the reaction mixture.

Randomly branched polycarbonates and methods of preparing them are known from U.S. Pat. No. 4,001,184. At least 20 weight percent of a stoichiometric quantity of a carbonate precursor, such as an acyl halide or a haloformate, is reacted with a mixture of a dihydric phenol and at least 0.05 mole percent of a polyfunctional aromatic compound in a medium of water and a solvent for the polycarbonate. The medium contains at least 1.2 mole percent of a polymerization catalyst. Sufficient alkali metal hydroxide is added to the reaction medium to maintain a pH range of 3 to 6, and then sufficient alkali metal hydroxide is added to raise the pH to at least 9 but less than 12 while reacting the remaining carbonate precursor.

U.S. Pat. No. 6,225,436 discloses a process for preparing polycarbonates which allows the condensation reaction incorporation of an acyl halide compound into the polycarbonate in a manner which is suitable in batch processes and in continuous processes. Such acyl halide compounds can be mono-, di-, tri- or higher-functional and are preferably for branching or terminating the polymer molecules or providing other functional moieties at terminal or pendant locations in the polymer molecule.

U.S. Pat. No. 5,142,088 discloses the preparation of branched polycarbonates, and more particularly to novel intermediates useful in the preparation and a method for conversion of the intermediates via chloroformate oligomers to the branched polycarbonates. One method for making branched polycarbonates with high melt strength is a variation of the melt-polycondensation process where the diphenyl carbonate and Bisphenol A are polymerized together with polyfunctional alcohols or phenols as branching agents.

DE 19727709 discloses a process to make branched polycarbonate in the melt-polymerization process using aliphatic alcohols. It is known that alkali metal compounds and alkaline earth compounds, when used as catalysts added to the monomer stage of the melt process, will not only generate the desired polycarbonate compound, but also other products after a rearrangement reaction known as the "Fries" rearrangement. This is discussed in U.S. Pat. No. 6,323,304. The presence of the Fries rearrangement products in a certain range can increase the melt strength of the polycarbonate resin to make it suitable for bottle and sheet applications. This method of making a polycarbonate resin with a high melt strength has the advantage of having lower raw material costs compared with the method of making a branched polycarbonate by adding "branching agents." In general, these catalysts are less expensive and much lower amounts are required compared to the branching agents.

JP 09059371 discloses a method for producing an aromatic polycarbonate in the presence of a polycondensation catalyst, without the use of a branching agent, which results in a polycarbonate possessing a branched structure in a specific proportion. In particular, JP 09059371 discloses the fusion-polycondensation reaction of a specific type of aromatic dihydroxy compound and diester carbonate in the presence of an alkali metal compound and/or alkaline earth metal compound and/or a nitrogen-containing basic compound to produce a polycarbonate having an intrinsic viscosity of at least 0.2. The polycarbonate is then subject to further reaction in a special self-cleaning style horizontal-type biaxial reactor having a specified range of the ratio L/D of 2 to 30 (where L is the length of the horizontal rotating axle and D is the rotational diameter of the stirring fan unit). JP 09059371 teaches the addition of the catalysts directly to the aromatic dihydroxy compound and diester carbonate monomers.

U.S. Pat. No. 6,504,002 discloses a method for production of a branched polycarbonate composition, having increased melt strength, by late addition of branch-inducing catalysts to the polycarbonate oligomer in a melt polycondensation process, the resulting branched polycarbonate composition, and various applications of the branched polycarbonate composition. The use of polyhydric phenols having three or more hydroxy groups per molecule, for example, 1,1,1-tris-(4-hydroxyphenyl)ethane (THPE), 1,3,5-tris-(4-hydroxyphenyl)benzene, 1,4-bis-[di-(4-hydroxyphenyl)phenylmethyl]benzene, and the like, as branching agents for high melt strength blow-moldable polycarbonate 30 resins prepared interfacially has been described in U.S. Pat. Nos. Re. 27,682 and 3,799,953.

Other methods known to prepare branched polycarbonates through heterogeneous interfacial polymerization methods include the use of cyanuric chloride as a branching agent (U.S. Pat. No. 3,541,059), branched dihydric phenols as branching agents (U.S. Pat. No. 4,469,861), and 3,3-bis-(4-hydroxyaryl)-oxindoles as branching agents (U.S. Pat. No. 4,185,009). Additionally, aromatic polycarbonates endcapped with branched alkyl acyl halides and/or acids and said to have improved properties are described in U.S. Pat. No. 4,431,793.

Trimellitic triacid chloride has also been used as a branching agent in the interfacial preparation of branched polycarbonate. U.S. Pat. No. 5,191,038 discloses branched polycarbonate compositions having improved melt strength and a method of preparing them from aromatic cyclic polycarbonate oligomers in a melt equilibration process.

The polycarbonates (B) included in the second component of the above-described embodiment of the present invention may be prepared according to known procedures by reacting the dihydroxyaromatic compound with a carbonate precursor such as phosgene, a haloformate or a carbonate ester, a molecular weight regulator, an acid acceptor and a catalyst. Methods for preparing polycarbonates are known in the art and are described, for example, in U.S. Pat. No. 4,452,933, which is hereby incorporated by reference herein.

Examples of suitable carbonate precursors include carbonyl bromide, carbonyl chloride, and mixtures thereof; diphenyl carbonate; a di(halophenyl)-carbonate, e.g., di(trichlorophenyl) carbonate, di(tribromophenyl) carbonate, and the like; di(alkylphenyl)carbonate, e.g., di(tolyl)carbonate; di(naphthyl)carbonate; di(chloronaphthyl)carbonate, or mixtures thereof; and bis-haloformates of dihydric phenols.

Examples of suitable molecular weight regulators include phenol, cyclohexanol, methanol, alkylated phenols, such as octylphenol, para-tertiary-butyl-phenol, and the like. The preferred molecular weight regulator is phenol or an alkylated phenol.

The acid acceptor may be either an organic or an inorganic acid acceptor. A suitable organic acid acceptor is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalysts that can be used are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Polycarbonate (B) of the second component of the polyester compositions of the invention also may be copolyestercarbonates such as those described in U.S. Pat. Nos. 3,169,121; 3,207,814; 4,194,038; 4,156,069; 4,430,484, 4,465,820, and 4,981,898, all of which are incorporated by reference herein.

Copolyestercarbonates useful in this invention are available commercially. They are typically obtained by the reaction of at least one dihydroxyaromatic compound with a mixture of phosgene and at least one dicarboxylic acid chloride, especially isophthaloyl chloride, terephthaloyl chloride, or both.

The ratio of polyester component (B) to polycarbonate component (C) in the second component of the invention is not a critical feature of the present invention, but is determined by the required index of refraction match with the first component, and may be determined by the individual practitioner of this invention. Typically, the weight ratio of polyester (A) to polycarbonate (B) will range from about 99:1 to about 1:99, preferably from about 75:25 to about 25:75, and most preferably is about 75:25 to about 50:50.

In all of the embodiments of the invention, the second component of the polymer composition may also comprise at least one salt (D) prepared from the reaction of one or more acidic phosphorus-containing compounds and one or more basic organic compounds which contain nitrogen. Salt (D) useful in the invention is prepared by the reaction of one or more acidic phosphorus-containing compounds with one or more basic organic compounds preferably containing nitrogen, wherein the phosphorus-containing compounds are selected from compounds having the formula:

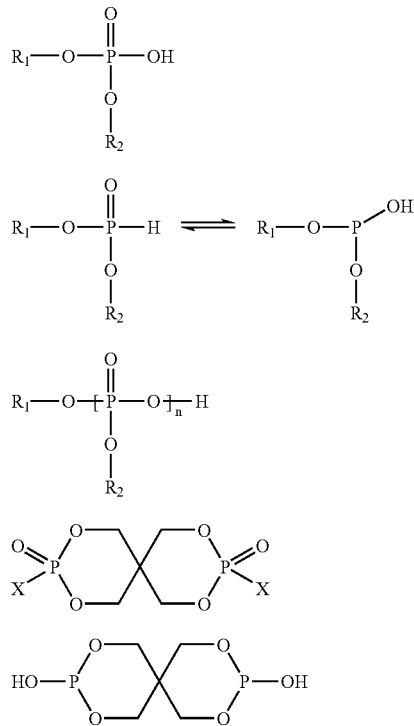

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

n is 2 to 500; and

X is selected from hydrogen and hydroxy;

and wherein the basic organic compounds are selected from compounds having the formulas:

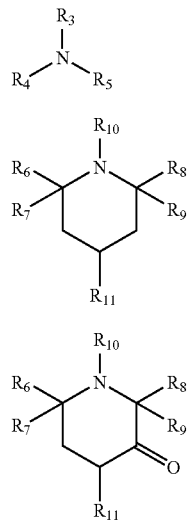

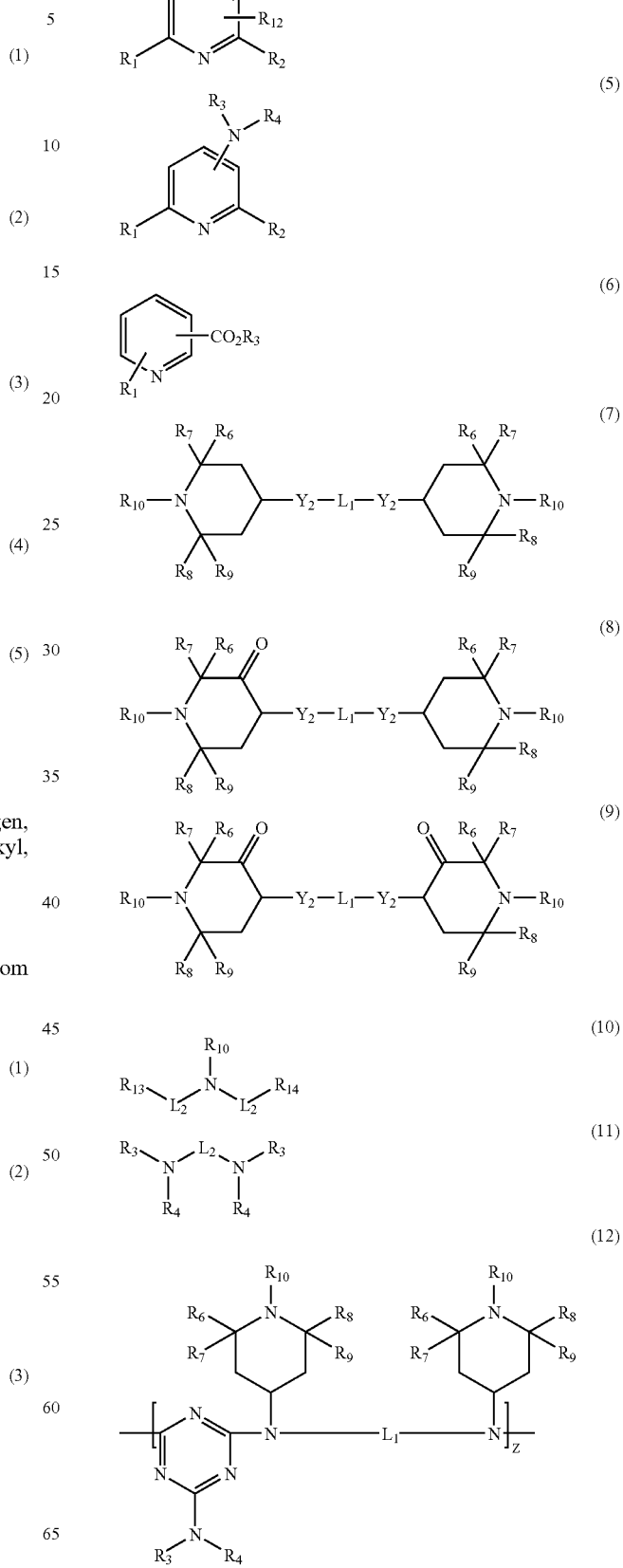

-continued
(13)
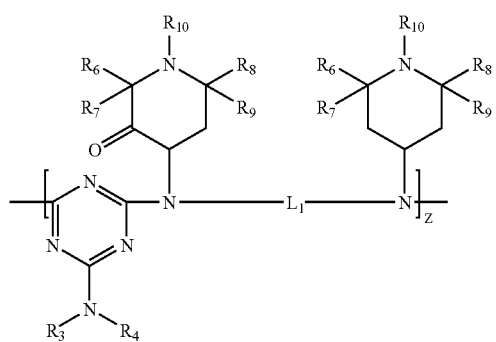
(14)
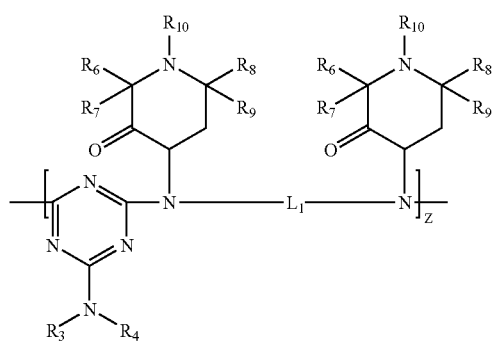
(15)
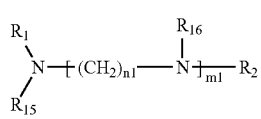
(16)
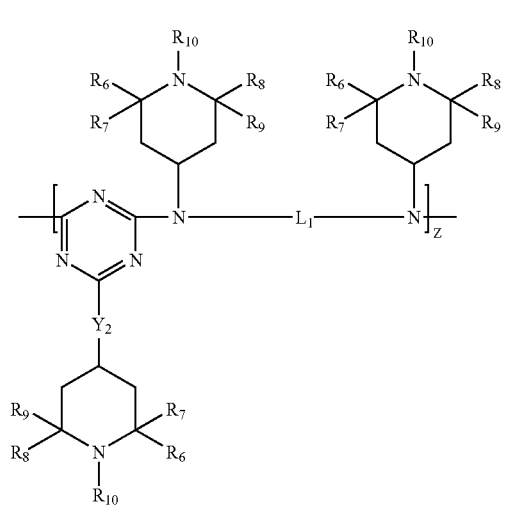
(17)
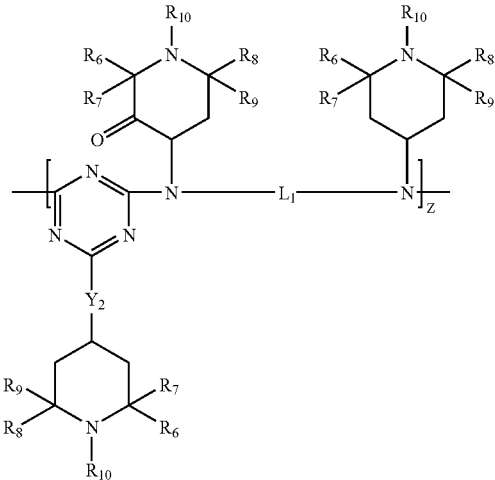
(18)
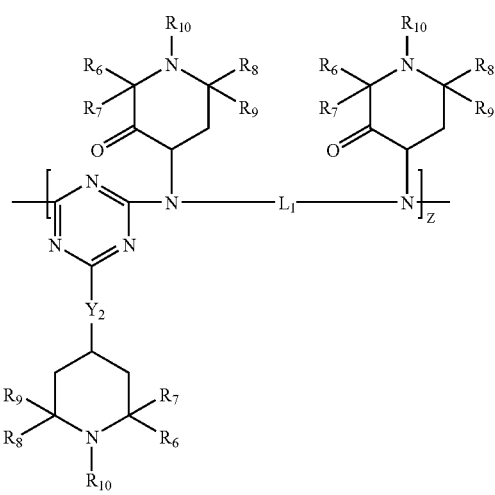
(19)
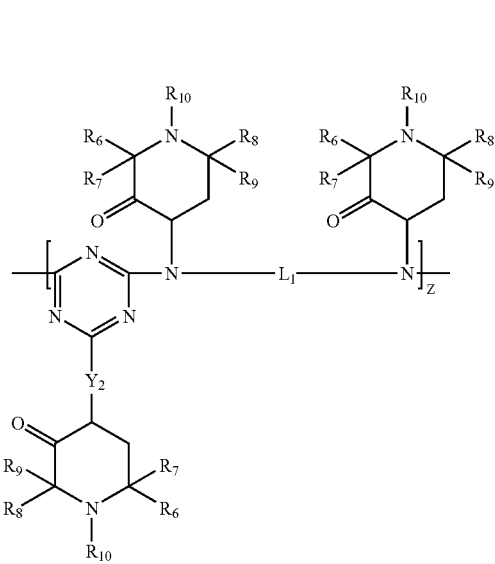

-continued

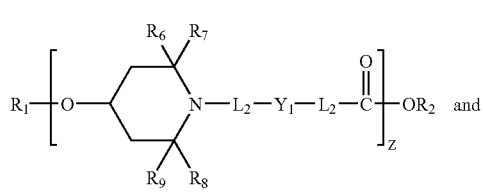
(20)

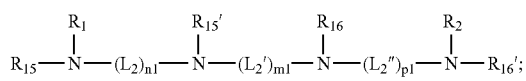
(21)

wherein

R$_1$ and R$_2$ are independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;

R$_3$, R$_4$, and R$_5$ are independently selected from hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl wherein at least one of R$_3$, R$_4$, and R$_5$ is a substituent other than hydrogen; R$_3$ and R$_4$ or R$_4$ and R$_5$ collectively may represent a divalent group forming a ring with the nitrogen atom to which they are attached, e.g., morpholino, piperidino and the like;

R$_6$, R$_7$, R$_8$, and R$_9$ are independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl;

R$_{10}$ is selected from hydrogen, —OR$_6$, C$_1$-C$_{22}$-alkyl, substituted C$_1$-C$_{22}$-alkyl, C$_3$-C$_8$-cycloalkyl, substituted C$_3$-C$_8$-cycloalkyl;

R$_{11}$ is selected from hydrogen; C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl, —Y$_1$—R$_3$ or a succinimido group having the formula

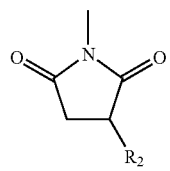

R$_{12}$ is selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl and may be located at the 2, 3 or 4 positions on the aromatic ring;

the —N(R$_3$)(R$_4$) group may be located at the 2, 3 or 4 positions on the pyridine ring of nitrogen compound (5);

the —CO$_2$R$_3$ and R$_1$ groups may be located at any of the 2, 3, 4, 5, 6 positions of the pyridine ring of nitrogen compound (6);

L$_1$ is a divalent linking group selected from C$_2$-C$_{22}$-alkylene;  —(CH$_2$CH$_2$—Y)$_{1-3}$—CH$_2$CH$_2$—;  C$_3$-C$_8$-cycloalkylene; arylene; or —CO-L$_2$-OC—;

L$_2$, L$_2$' and L$_2$'' are independently selected from C$_1$-C$_{22}$-alkylene, arylene, —(CH$_2$CH$_2$—Y$_1$)$_{1-3}$—CH$_2$CH$_2$— and C$_3$-C$_8$-cycloalkylene;

Y$_1$ is selected from —OC(O)—, —NHC(O)—, —O—, —S—, —N(R$_1$)—;

Y$_2$ is selected from —O— or —N(R$_1$)—;

R$_{13}$ and R$_{14}$ are independently selected from —O—R$_2$, and —N(R$_2$)$_2$;

Z is a positive integer of up to about 20, preferably up to about 6;

m1, n1 and p1 are independently selected from 1 to about 12;

R$_{15}$, R$_{15}$', R$_{16}$ are R$_{16}$' are independently selected from hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl, and radical A wherein radical A is selected from the following structures:

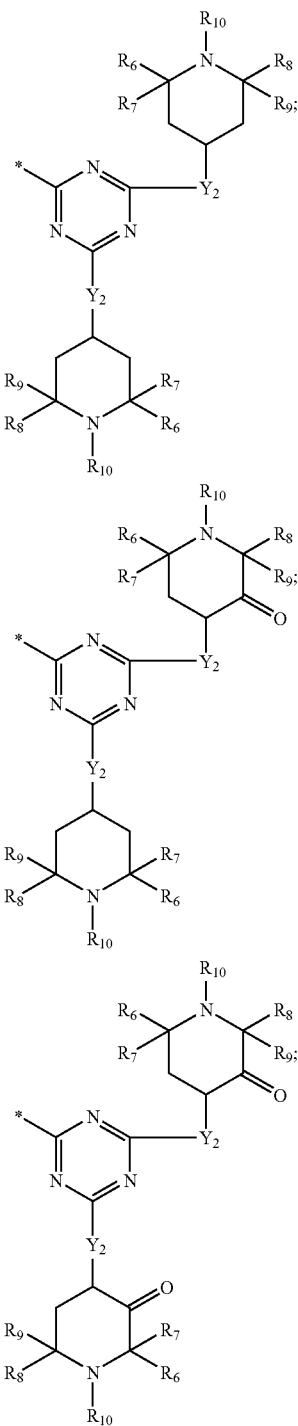

Radical A structures wherein * designates the position of attachment.

preferably at least one of $R_{15}$ and $R_{16}$ is an A radical; and wherein the ratio of the number of phosphorus atoms in the acidic phosphorus-containing compound to the number of basic nitrogen atoms in the basic organic compound is about 0.05 to about 2, preferably from about 0.25 to about 1.1.

The term "$C_1$-$C_{22}$-alkyl" denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$ alkanoyloxy and the like.

The term "$C_3$-$C_8$-cycloalkyl" is used to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, halogen, and the like.

The term "aryl" is used to denote an aromatic radical containing 6, 10 or 14 carbon atoms in the conjugated aromatic ring structure and these radicals substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; halogen and the like; $C_3$-$C_8$-cycloalkyl; halogen; hydroxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2-and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1, 3, 4-oxadiazol-2-yl, 1, 3, 4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —O—$C_1$-$C_6$-alkyl and —OCOC$_1$—$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, acetyloxy and propionyloxy. The term "halogen" is used to represent fluorine, chlorine, bromine, and iodine; however, chlorine and bromine are preferred.

The term "$C_2$-$C_{22}$-alkylene" is used to denote a divalent hydrocarbon radical that contains from two to twenty-two carbons and which may be straight or branched chain and which may be substituted with one or more substituents selected from hydroxy, halogen, $C_1$-$C_6$-alkoxy, $C_2$-$C_6$-alkanolyloxy and aryl. The term "$C_3$-$C_8$-cycloalkylene" is used to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$— alkyl, $C_1$-$C_6$-alkoxy and halogen.

Salt (D) useful in the second component of the invention may be prepared by bringing together the acidic phosphorus-containing compound and the basic nitrogen-containing organic compound in a suitable manner. A suitable manner is any procedure that involves contacting the acidic phosphorus-containing acid with the basic organic compound. For example, the acidic phosphorus-containing compound and the basic nitrogen-containing organic compound may be dissolved in appropriate solvents and the solutions mixed followed by precipitation of the reaction product; mixing the phosphorus-containing acid and the basic organic compound without solvent; and the like.

The ratio of the number of phosphorus atoms in the acidic phosphorus-containing compound to the number of basic nitrogen atoms in the basic organic compound may be in the range of about 0.05 to about 2, preferably from about 0.25 to about 1.1. Compositions that contain a large excess of unreacted phosphorus-containing acidic compounds may result in corrosion of process equipment during concentrate manufacture and have a negative effect on the hydrolytic stability of the polymer.

The salt or salts useful in the second component of the invention typically is present in the polymer compositions in concentrations ranging from about 0.01 to about 0.25 weight percent based on the total weight of the polymer composition, i.e., the total weight of the first component, i.e., polyester (A), and in the second component, i.e., the polycarbonate (B), polyester (C), and optionally, Salt(s) (D), as well as any additional components present such as stabilizers and pigments and colorants. Concentrations of Salt(s) (D) within this range typically are effective to improve the color of polyesters and polyester-polycarbonate compositions. Additionally, the color of polyester compositions that contain UV absorbers and/or phenolic antioxidants is improved. The concentration of the Salt(s) (D) preferably is about 0.05 to 0.15 weight percent (same weight basis as described).

The acidic phosphorus-containing compounds of Salt(s) (D) preferably are phosphorous acid, phosphoric acid and polyphosphoric acid, most preferably phosphorous acid.

Examples of suitable basic organic compounds useful in preparing Salt(s)(D) include alkyl amines such as triethylamine and 2,2,6,6-tetramethylpiperidine, pyridine and substituted pyridines, piperidine and substituted piperidines, morpholine and substituted morpholines and the like. The preferred basic organic compounds are hindered amine light stabilizers (HALS) such as: Cyasorb UV-3346 (Cytec Industries, CAS# 90751-07-8), Cyasorb UV-3529 (Cytec Industries, CAS# 193098-40-7), Cyasorb UV-3641 (Cytec Industries, CAS# 106917-30-0), Cyasorb UV-3581 (Cytec Industries, CAS# 79720-19-7), Cyasorb UV-3853 (Cytec Industries, CAS# 167078-06-0), Cyasorb UV-3853S (Cytec Industries, CAS# 24860-22-8), Tinuvin 622 (Ciba Specialty Chemicals, CAS# 65447-77-0), Tinuvin 770 (Ciba Specialty Chemicals, CAS# 52829-07-9), Tinuvin 144 (Ciba Specialty Chemicals, CAS# 63843-89-0), Tinuvin 123 (Ciba Specialty Chemicals, CAS# 129757-67-1), Chimassorb 944 (Ciba Specialty Chemicals, CAS# 71878-19-8), Chimassorb 119 (Ciba Specialty Chemicals, CAS# 106990-43-6), Chimassorb 2020 (Ciba Specialty Chemicals, CAS# 192268-64-7), Lowilite 76 (Great Lakes Chemical Corp., CAS# 41556-26-7), Lowilite 62 (Great Lakes Chemical Corp., CAS# 65447-77-0), Lowilite 94 (Great Lakes Chemical Corp., CAS# 71878-19-8), Uvasil 299LM (Great Lakes Chemical Corp., CAS# 182635-99-0), and Uvasil 299HM (Great Lakes Chemical Corp., CAS# 182635-99-0), Dastib 1082 (Vocht a.s., CAS# 131290-28-3), Uvinul 4049H (BASF Corp., CAS# 109423-00-9), Uvinul 4050H (BASF Corp., CAS# 124172-53-8), Uvinul 5050H (BASF Corp., CAS# 199237-39-3), Mark LA 57 (Asahi Denka Co., Ltd., CAS# 64022-61-3), Mark LA 52 (Asahi Denka Co., Ltd., CAS# 91788-83-9), Mark LA 62 (Asahi Denka Co., Ltd., CAS# 107119-91-5), Mark LA 67 (Asahi Denka Co., Ltd., CAS# 100631-43-4), Mark LA 63 (Asahi Denka Co., Ltd. Co., Ltd. Co., CAS# 115055-30-6), Mark LA 68 (Asahi Denka Co., Ltd., CAS# 100631-44-5), Hostavin N 20 (Clariant Corp., CAS# 95078-42-5), Hostavin N 24 (Clariant Corp., CAS# 85099-51-1, CAS# 85099-50-9), Hostavin N 30 (Clariant Corp., CAS# 78276-66-1), Diacetam-5 (GTPZAB Gigiena Truda, USSR, CAS# 76505-58-3), Uvasorb-HA 88 (3V Sigma, CAS# 136504-96-6), Goodrite UV-3034 (BF Goodrich Chemical Co., CAS# 71029-16-8), Goodrite UV-3150 (BF Goodrich Chemical Co., CAS# 96204-36-3), Goodrite UV-3159 (BF Goodrich Chemical Co., CAS# 130277-45-1), Sanduvor 3050 (Clariant Corp., CAS# 85099-51-0), Sanduvor PR-31 (Clariant Corp., CAS# 147783-69-5), UV Check AM806 (Ferro Corp., CAS# 154636-12-1), Sumisorb TM-061(Sumitomo Chemical Company, CAS# 84214-94-8), Sumisorb LS-060 (Sumitomo Chemical Company, CAS# 99473-08-2), Uvasil 299 LM (Great Lakes Chemical Corp., CAS# 164648-93-5), Uvasil 299 HM (Great Lakes Chemical Corp., CAS# 164648-93-5), Nylostab S-EED (Clariant Corp., CAS# 42774-15-2). Additional preferred hindered amine light stabilizer may be listed in the *Plastic Additives Handbook* 5$^{th}$ *Edition* (Hanser Gardner Publications, Inc., Cincinnati, Ohio, USA, 2001).

The hindered amine light stabilizers of Salt(s)(D) having above formulas (2), (3), (7), (8), (9), (12), (13), (14), (15), (16), (17), (18), (19), (20) and (21) represent the preferred basic compounds. Chimassorb 944 (Ciba Specialty Chemicals, CAS# 71878-19-8), Cyasorb UV-3529 (Cytec Industries, CAS# 193098-40-7), Chimassorb 119 (Ciba Specialty Chemicals, CAS# 106990-43-6) and Tinuvin 770 (Ciba Specialty Chemicals, CAS# 52829-07-9) and any equivalents thereof are specific examples of the preferred basic compounds. A more preferred groups of the basic nitrogen compounds are the hindered amine light stabilizers having above formulas (2), (3), (7), (8), (9), (12), (13), (14), (15), (16), (17), (18) and (19) wherein radical R10 is hydrogen or C1-C22 alkyl and formula (15) wherein at least one of R15 and R16 represents radical A wherein R10 is hydrogen or C1-C22 alkyl. The most preferred are high molecular weight HALS wherein the molecular weight is greater than about 1000 such as Cyasorb UV-3529 (Cytec Industries, CAS# 193098-40-7). The most preferred HALS correspond to formula or structure 12. In one embodiment, it is preferred that the HALS correspond to formula (12) and that $R_6=R_7=R_8=R_9=R_{10}$=methyl, (R3)(R4)N— collectively represent morpholino, $L_1$ is C1 to C6 alkylene, and Z is 1 to 6. Additionally, the hindered amine light stabilizers having above formulas (12), (13), (14), (15), (16), (17), (18) and (19) wherein radical R10 is hydrogen or C1-C22 alkyl and formula (15) wherein at least one of R15 and R16 represents radical A wherein R10 is hydrogen or C1-C22 alkyl are particularly preferred for improved hydrolytic stability of polyester, polycarbonate and polyester-polycarbonate composition.

It is another embodiment of the invention that Salt(s)(D) is useful in any embodiment of the invention in combination with at least one triazine UV light absorber.

The polymer compositions of the present invention may include any various additives conventional in the art. For example, the polymer blend can include from about 0.01 to about 50 weight percent, based on the total weight of the composition, of at least one additional additive selected from a lubricant, a non-polymeric plasticizer, flame retardants (including but not limited to phosphorous containing and halogenated flame retardants), thermal stabilizers, an antioxidant (including but not limited to phenolic antioxidants and hindered phenols), a pro-oxidant, an acid scavenger, impact modifiers, ultraviolet light stabilizers (such as triazine), promoters of photodegradation, an antistatic agent, a pigment, dyes, or colorants and pigments (such as organic colorants, inorganic colorants and or white pigments such as $TiO_2$, ZnO and baryta), synergists, processing aids, phosphite stabilizers, phosphonite stabilizers and other stabilizers known to one skilled in the art. Typical non-polymeric plasticizers include dioctyl adipate, phosphates, and diethyl phthalate. Representative inorganics include, talc, TiO2, CaCO3, NH4CL, and silica. Colorants can be monomeric, oligomeric, and polymeric. Preferred polymeric colorants are aliphatic polyesters, aliphatic-aromatic copolyesters, or aromatic polyesters in which the color producing monomer, i.e., a dye, is covalently incorporated into the polymer. Such representative polymeric colorants are described by Weaver et al. in U.S. Pat. Nos. 4,892,922, 4,892,923, 4,882,412, 4,845,188, 4,826,903 and 4,749,773 the entire disclosures of which are incorporated herein by reference.

The terms "phenolic antioxidants" and "hindered phenol" are primary antioxidants that are known to those skilled in the art and may be represented by the structures listed on pages 98-108 in the *Plastic Additives Handbook* 5$^{th}$ *Edition* (Hanser Gardner Publications, Inc., Cincinnati, Ohio, USA, 2001), incorporated herein by reference in its entirety. Some common phenolic antioxidants are as follows: Irganox 1010 (Ciba Specialty Chemicals, CAS# 6683-19-8), Irganox 1330 (Ciba Specialty Chemicals, CAS# 1709-70-2) and Irganox 3114 (Ciba Specialty Chemicals, CAS# 27676-62-6)., The terms "phosphite stabilizers" and "phosphonite stabilizers" refer to secondary antioxidants that are known to those skilled in the art and may be represented by the structures listed on pages 109-112 in the *Plastic Additives Handbook* 5$^{th}$ *Edition* (Hanser Gardner Publications, Inc., Cincinnati, Ohio, USA, 2001), incorporated herein by reference in its entirety. Some common phosphite stabilizers are as follows: Ultranox 626 (GE Specialty Chemicals, CAS# 26741-53-7), Irgafos 168 (Ciba Specialty Chemicals, CAS# 31570-04-4), Weston 619 (GE Specialty Chemicals, CAS# 3806-34-6) and Doverphos S-9228 (Dover Chemicals, CAS# 154862-43-8).

The term "halogenated flame-retardants" is defined as compounds that can contain one or more of the following: fluorine, chlorine, bromine, and iodine, which act in such a way as to decrease the flammability of the polymer composition. More preferred are compounds that contain bromine such as brominated polycarbonate, brominated polystyrene, and the like.

Although not essential, the polymer blends of the invention may comprise a plasticizer. The presence of the plasticizer is useful to enhance flexibility and the good mechanical properties of the calendered film or sheet. The plasticizer also helps to lower the processing temperature of the polyesters. The plasticizers typically comprise one or more aromatic rings. The preferred plasticizers are soluble in the polyester as indicated by dissolving a 5-mil (0.127 mm) thick film of the polyester to produce a clear solution at a temperature of 160° C. or less. More preferably, the plasticizers are soluble in the polyester as indicated by dissolving a 5-mil (0.127 mm) thick film of the polyester to produce a clear solution at a temperature of 150° C. or less. The solubility of the plasticizer in the polyester may be determined as follows:

1. Placing into a small vial a ½ inch section of a standard reference film, 5 mils (0.127 mm) in thickness and about equal to the width of the vial.
2. Adding the plasticizer to the vial until the film is covered completely.
3. Placing the vial with the film and plasticizer on a shelf to observe after one hour and again at 4 hours. Note the appearance of the film and liquid.
4. After the ambient observation, placing the vial in a heating block and allow the temperature to remain constant at 75° C. for one hour and observe the appearance of the film and liquid.
5. Repeating step 4 for each of the following temperatures (° C.): 100, 140, 150, and 160.

Examples of plasticizers potentially useful in the invention are as follows:

TABLE A

| Plasticizers |
| --- |
| Adipic Acid Derivatives |
| |
| Dicapryl adipate |
| Di-(2-ethylhexyl adipate) |
| Di(n-heptyl, n-nonyl) adipate |
| Diisobutyl adipate |
| Diisodecyl adipate |
| Dinonyl adipate |
| Di-(tridecyl) adipate |
| Azelaic Acid Derivatives |
| |
| Di-(2-ethylhexyl azelate) |
| Diisodecyl azelate |
| Diisoctyl azealate |
| Dimethyl azelate |
| Di-n-hexyl azelate |
| Benzoic Acid Derivatives |
| |
| Diethylene glycol dibenzoate (DEGDB) |
| Dipropylene glycol dibenzoate |
| Propylene glycol dibenzoate |
| Polyethylene glycol 200 dibenzoate |
| Neopentyl glycol dibenzoate |
| Citric Acid Derivatives |
| |
| Acetyl tri-n-butyl citrate |
| Acetyl triethyl citrate |
| Tri-n-Butyl citrate |
| Triethyl citrate |
| Dimer Acid Derivatives |
| |
| Bis-(2-hydroxyethyl dimerate) |
| Epoxy Derivatives |
| |
| Epoxidized linseed oil |
| Epoxidized soy bean oil |
| 2-Ethylhexyl epoxytallate |
| Fumaric Acid Derivatives |
| |
| Dibutyl fumarate |
| Glycerol Derivatives |
| |
| Glycerol Tribenzoate |
| Glycerol triacetate |
| Glycerol diacetate monolaurate |
| Isobutyrate Derivative |
| |
| 2,2,4-Trimethyl-1,3-pentanediol, Diisobutyrate |
| Texanol diisobutyrate |
| Isophthalic Acid Derivatives |
| |
| Dimethyl isophthalate |
| Diphenyl isophthalate |
| Di-n-butylphthalate |

TABLE A-continued

| Plasticizers |
| --- |
| Lauric Acid Derivatives |
| |
| Methyl laurate |
| Linoleic Acid Derivative |
| |
| Methyl linoleate, 75% |
| Maleic Acid Derivatives |
| |
| Di-(2-ethylhexyl) maleate |
| Di-n-butyl maleate |
| Mellitates |
| |
| Tricapryl trimellitate |
| Triisodecyl trimellitate |
| Tri-(n-octyl,n-decyl)trimellitate |
| Triisonyl trimellitate |
| Myristic Acid Derivatives |
| |
| Isopropyl myristate |
| Oleic Acid Derivatives |
| |
| Butyl oleate |
| Glycerol monooleate |
| Glycerol trioleate |
| Methyl oleate |
| n-Propyl oleate |
| Tetrahydrofurfuryl oleate |
| Palmitic Acid Derivatives |
| |
| Isopropyl palmitate |
| Methyl palmitate |
| Paraffin Derivatives |
| |
| Chloroparaffin, 41% Cl |
| Chloroparaffin, 50% Cl |
| Chloroparaffin, 60% Cl |
| Chloroparaffin, 70% Cl |
| Phosphoric Acid Derivatives |
| |
| 2-Ethylhexyl diphenyl phosphate |
| Isodecyl diphenyl phosphate |
| t-Butylphenyl diphenyl phosphate |
| Resorcinol bis(diphenyl phosphate) (RDP) |
|     100% RDP |
|     Blend of 75% RDP, 25% DEGDB (by wt) |
|     Blend of 50% RDP, 50% DEGDB (by wt) |
|     Blend of 25% RDP, 75% DEGDB (by wt) |
| Tri-butoxyethyl phosphate |
| Tributyl phosphate |
| Tricresyl phosphate |
| Triphenyl phosphate |
| Phthalic Acid Derivatives |
| |
| Butyl benzyl phthalate |
| Texanol benzyl phthalate |
| Butyl octyl phthalate |
| Dicapryl phthalate |
| Dicyclohexyl phthalate |
| Di-(2-ethylhexyl) phthalate |
| Diethyl phthalate |
| Dihexyl phthalate |
| Diisobutyl phthalate |
| Diisodecyl phthalate |
| Diisoheptyl phthalate |
| Diisononyl phthalate |
| Diisooctyl phthalate |
| Dimethyl phthalate |
| Ditridecyl phthalate |
| Diundecyl phthalate |
| Ricinoleic Acid Derivatives |
| |
| Butyl ricinoleate |
| Glycerol tri(acetyl) ricinlloeate |
| Methyl acetyl ricinlloeate |
| Methyl ricinlloeate |
| n-Butyl acetyl ricinlloeate |
| Propylene glycol ricinlloeate |

TABLE A-continued

Plasticizers

Sebacic Acid Derivatives

Dibutyl sebacate
Di-(2-ethylhexyl) sebacate
Dimethyl sebacate

Stearic Acid Derivatives

Ethylene glycol monostearate
Glycerol monostearate
Isopropyl isostearate
Methyl stearate
n-Butyl stearate
Propylene glycol monostearate Succinic Acid Derivatives Diethyl succinate Sulfonic Acid Derivatives N-Ethyl o,p-toluenesulfonamide
o,p-toluenesulfonamide A similar test to that above is described in *The Technology of Plasticizers*, by J. Kern Sears and Joseph R. Darby, published by Society of Plastic Engineers/Wiley and Sons, New York, 1982, pp 136-137. In this test, a grain of the polymer is placed in a drop of plasticizer on a heated microscope stage. If the polymer disappears, then it is solubilized. The plasticizers can also be classified according to their solubility parameter. The solubility parameter, or square root of the cohesive energy density, of a plasticizer can be calculated by the method described by Coleman et al., *Polymer* 31, 1187 (1990). The most preferred plasticizers will have a solubility parameter ($\delta$) in the range of about 9.5 to about 13.0 $cal^{0.5}$ $cm^{-1.5}$. It is generally understood that the solubility parameter of the plasticizer should be within 1.5 units of the solubility parameter of polyester. The plasticizers in Table B that are preferred in the context of this invention are as follows:

TABLE B

Preferred Plasticizers

Glycerol diacetate monolaurate
Texanol diisobutyrate
Di-2-ethylhexyladipate
Trioctyltrimellitate
Di-2-ethylhexylphthalate
Texanol benzyl phthalate
Neopentyl glycol dibenzoate
Dipropylene glycol dibenzoate
Butyl benzyl phthalate
Propylene glycol dibenzoate
Diethylene glycol dibenzoate
Glycerol tribenzoate Examples of plasticizers which may be used according to the invention are esters comprising: (i) acid residues comprising one or more residues of: phthalic acid, adipic acid, trimellitic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms. Further, non-limiting examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. The plasticizer also may comprise one or more benzoates, phthalates, phosphates, or isophthalates. In another example, the plasticizer comprises diethylene glycol dibenzoate, abbreviated herein as "DEGDB".

A flame retardant may be added to the polymer blend at a concentration of about 5 weight percent to about 40 weight percent based on the total weight of the polymer blend. Other examples of flame retardant levels are about 7 weight percent to about 35 weight percent, about 10 weight percent to about 30 weight percent, and about 10 weight percent to about 25 weight percent. Preferably, the flame retardant comprises one or more monoesters, diesters, or triesters of phosphoric acid. The phosphorus-containing flame retardant may also function as a plasticizer for the polyester. In another example, the plasticizer comprises diethylene glycol dibenzoate and the flame retardant comprises resorcinol bis(diphenyl phosphate). The flame retardant film or sheet will typically give a V2 or greater rating in a UL94 burn test. In addition, our flame retardant film or sheet typically gives a burn rate of 0 in the Federal Motor Vehicle Safety Standard 302 (typically referred to as FMVSS 302).

The phosphorus-containing flame retardant is preferably miscible with the polyester or the plasticized polyester. The term "miscible", as used herein," is understood to mean that the flame retardant and the plasticized polyester will mix together to form a stable mixture which will not separate into multiple phases under processing conditions or conditions of use. Thus, the term "miscible" is intended include both "soluble" mixtures, in which flame retardant and plasticized polyester form a true solution, and "compatible" mixtures, meaning that the mixture of flame retardant and plasticized polyester do not necessarily form a true solution but only a stable blend. Preferably, the phosphorus-containing compound is a non-halogenated, organic compound such as, for example, a phosphorus acid ester containing organic substituents. The flame retardant may comprise a wide range of phosphorus compounds well-known in the art such as, for example, phosphines, phosphites, phosphinites, phosphonites, phosphinates, phosphonates, phosphine oxides, and phosphates. Examples of phosphorus-containing flame retardants include tributyl phosphate, triethyl phosphate, tributoxyethyl phosphate, t-Butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine.

The term "phosphorus acid" as used in describing the phosphorus-containing flame retardants of the invention include the mineral acids such as phosphoric acid, acids having direct carbon-to-phosphorus bonds such as the phosphonic and phosphinic acids, and partially esterified phosphorus acids which contain at least one remaining unesterified acid group such as the first and second degree esters of phosphoric acid and the like. Typical phosphorus acids that can be employed in the present invention include, but are not limited to: dibenzyl phosphoric acid, dibutyl phosphoric acid, di(2-ethylhexyl) phosphoric acid, diphenyl phosphoric acid, methyl phenyl phosphoric acid, phenyl benzyl phosphoric acid, hexylphosphonic acid, phenylphosphonic acid tolylphosphonic acid, benzyl phosphonic acid, 2-phenylethylphosphonic acid, methylhexylphosphinic acid, diphenylphosphinic acid, phenylnaphthylphosphinic acid, dibenzylphosphinic acid, methylphenylphosphinic acid, phenylphosphonous acid, tolylphosphonous acid, benzylphosphonous acid, butyl phosphoric acid, 2-ethyl hexyl phosphoric acid, phenyl phosphoric acid, cresyl phosphoric acid, benzyl phosphoric acid, phenyl phosphorous acid, cresyl phosphorous acid, benzyl phosphorous acid, diphenyl phosphorous acid, phenyl benzyl phosphorous acid, dibenzyl phosphorous acid, methyl phenyl phosphorous acid, phenyl phenylphosphonic acid, tolyl methylphosphonic acid, ethyl benzylphosphonic acid, methyl ethylphosphonous acid, methyl phenylphosphonous acid, and phenyl phenylphosphonous acid. The flame retardant typically comprises one or more monoesters, diesters, or triesters of phosphoric acid. In another example, the flame retardant comprises resorcinol bis(diphenyl phosphate), abbreviated herein as "RDP".

Oxidative stabilizers also may be used with polyesters of the present invention to prevent oxidative degradation during processing of the molten or semi-molten material on the rolls. Such stabilizers include esters such as distearyl thiodipropionate or dilauryl thiodipropionate; phenolic stabilizers such as IRGANOX® 1010 available from Ciba-Geigy AG, ETHANOX® 330 available from Ethyl Corporation, and butylated hydroxytoluene; and phosphorus containing stabilizers such as Irgafos® available from Ciba-Geigy AG and WESTON® stabilizers available from GE Specialty Chemicals. These stabilizers may be used alone or in combinations The novel polymer compositions may also contain a phosphorus catalyst quencher component which is, typically one or more phosphorus compounds such as a phosphorus acid, e.g., phosphoric and/or phosphorous acids, or an ester of a phosphorus acid such as a phosphate or phosphite ester. Further examples of phosphorus catalyst quenchers are described in U.S. Pat. Nos. 5,907,026 and 6,448,334. The amount of phosphorus catalyst quencher present typically provides an elemental phosphorus content of about 0 to 0.5 weight percent, preferably 0.05 to 0.3 weight percent, based on the total weight of the first and second components of the invention.

It is also possible to use agents such as sulfoisophthalic acid to increase the melt strength of the polyester to a desirable level. In addition, the polymer blends may contain dyes, pigments, fillers, matting agents, antiblocking agents, antistatic agents, blowing agents, chopped fibers, glass, impact modifiers, carbon black, talc, $TiO_2$ and the like as desired. Colorants, sometimes referred to as added to impart a desired neutral hue and/or brightness to the polyester and the calendered product.

The various components of the polymer blends such as, for example, the flame retardant, release additive, plasticizer, and toners, may be blended in batch, semicontinuous, or continuous processes. Small scale batches may be readily prepared in any high-intensity mixing devices well-known to those skilled in the art, such as Banbury mixers, batch mixers, ribbon blenders, roll mill, torque rheometer, a single screw extruder, or a twin screw extruder. The components also may be blended in solution in an appropriate solvent. The melt blending method includes blending the polyester, plasticizer, flame retardant, additive, and any additional non-polymerized components at a temperature sufficient to melt the polyester. The blend may be cooled and pelletized for further use or the melt blend can be calendered directly from this molten blend into film or sheet. The term "melt" as used herein includes, but is not limited to, merely softening the polyester. For melt mixing methods generally known in the polymer art, see "Mixing and Compounding of Polymers" (I. Manas-Zloczower & Z. Tadmor editors, Carl Hanser Verlag Publisher, 1994, New York, N.Y.). When colored sheet or film is desired, pigments or colorants may be included in the polyester mixture during the reaction of the diol and the dicarboxylic acid or they may be melt blended with the preformed polyester. A preferred method of including colorants is to use a colorant having thermally stable organic colored compounds having reactive groups such that the colorant is copolymerized and incorporated into the polyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the polyester reaction process after an ester interchange or direct esterification reaction.

A "visually clear" blend is defined herein as one where the article made therefrom has a diffuse transmittance value of about 40% or greater. An "opaque" or "cloudy" blend is defined as one where the article made therefrom has a diffuse transmittance value of less than about 40%. The injection molded articles prepared from the polymer compositions of the present invention are characterized by a novel combination of properties which preferably include polymer compositions having a visual clearness or clarity or haze value and having a diffuse transmittance value of greater than about 60% or more, and in another embodiment, greater than 80%, as determined by ASTM Method D1003.

The properties of the polymer compositions measured in the Examples herein are shown in Tables I, II, and III and are listed as follows: Heat Deflection Temperature (HDT), at 455 kilopascals (kPa—about 66 pounds per square inch—psi), was determined at 23° C. to be about of about 75 to 110° C.; an ASTM D256 Notched Izod Impact of about 70 to 210 J/m (1.23-4.0 ft-lbs/in); an ASTM D256 Unnotched Izod Impact Strength of at least 1500 J/m, (30 ft-lbs/in); an ASTM D790 Flexural Modulus of 2100 to 2400 MPa(3.0E5 to 3.5E5 psi), an ASTM D790 Flexural Strength of about 77 to 85 Mpa (11000 to 12500 psi).

In general, in order to obtain a visually clear, immiscible composition of the invention, the refractive indices of the two polymers should not differ by an absolute value of more than 0.008, preferably 0.006, more preferably 0.004, or lower. However, the maximum difference in refractive index which may be tolerated depends on the blend composition, particle diameter, refractive index, wavelength, and particle structure as described by Biangardi et al., Die Angew, Makromole. Chemie, 183, 221 (1990).

The complete miscibility of PC and PCTG permits the matching of refractive index (RI) of the copolyester (A) with the RI of the PC/PCTG blend (B), by adjusting the PC/PCTG ratio.

The relationship between the amount of mol % CHDM in copolyester A based on total moles glycol and the weight % PCTG in the PC/PCTG blend (B) that is required to total transmittance, or minimal haze typically adheres the following relationship:

wt % PCTG in PC/PCTG=−0.0598(mol % CHDM)$^2$+1.5288(mol % CHDM)+60.06

These compositions may be prepared by any method known in the art. These compositions may be compounded in the melt, for example, by using a single screw or twin screw extruder. They may also be prepared by blending in solution. These blends are useful as thermoplastic molding compositions as well as other end uses.

The polyester blend may also be formed into film or sheet using many methods known to those skilled in the art, including but not limited to extrusion and calendering. In the extrusion process, the polyesters, typically in pellet form, are mixed together in a tumbler and then placed in a hopper of an extruder for melt compounding. Alternatively, the pellets may be added to the hopper of an extruder by various feeders, which meter the pellets in their desired weight ratios. Upon exiting the extruder the now homogenous copolyester blend is shaped into a film. The shape of the film is not restricted in any way. For example, it may be a flat sheet or a tube. The film obtained may be stretched, for example, in a certain direction by from 2 to 6 times the original measurements.

The stretching method for the film may be by any of the methods known in the art, such as, the roll stretching method, the long-gap stretching, the tenter-stretching method, and the tubular stretching method. With the use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also the stretching may be done first in one direction and then in the other direction to result in effective biaxial stretching.

In a general embodiment, the polymer blends of the invention are useful in making calendered film and/or sheet on calendering rolls. The polymer blend may also comprise one or more plasticizers to increase the flexibility and softness of calendered polyester film, improve the processing of the polyester, and help to prevent sticking of the polyester to the calender rolls. The invention also provides a process for film or sheet by calendering the novel polymer blends and for the film or sheet produced from such calendering processes. The calendered film or sheet typically have a thickness in the range of about 2 mils (0.05 mm) to about 80 mils (2 mm).

While the inherent viscosity (I.V.) of the polyesters (A) and (C) of the present invention is generally from about 0.3 to about 1.2 dL/g, other I.V.s are contemplated within the scope of this invention. The inherent viscosity, abbreviated herein as "I.V.", refers to inherent viscosity determinations made at 25° C. using 0.25 gram of polymer per 50 mL of a solvent composed of 60 weight percent phenol and 40 weight percent tetrachloroethane. The basic method of determining the I.V. of the polyesters herein is set forth in ASTM method D2857-95. To obtain superior calendering line speeds, the polyesters (B) of the present invention may have an inherent viscosity of about 0.55 to about 0.75 dL/g. Other examples of I.V. values which may be exhibited by the polymer blends are about 0.55 to about 0.70 dL/g, about 0.55 to about 0.65 dL/g, and about 0.60 to about 0.65 dL/g.

The polymer blends described above may additionally comprise an additive that is effective to prevent sticking of the polyester to the calendering rolls when the polyester is used to make calendered film. As used herein, the term "effective" means that the polyester passes freely between the calendering rolls without wrapping itself around the rolls or producing an excessive layer of polyester on the surface of the rolls. The amount of additive used in the polyester resin composition is typically about 0.1 to about 10 weight percent, based on the total weight percent of the polymer blend. The optimum amount of additive used is determined by factors well known in the art and is dependent upon variations in equipment, material, process conditions, and film thickness. Additional examples of additive levels are about 0.1 to about 5 weight percent and about 0.1 to about 2 weight percent. Examples of additives of the present invention include fatty acid amides such as erucylamide and stearamide; metal salts of organic acids such as calcium stearate and zinc stearate; fatty acids such as stearic acid, oleic acid, and palmitic acid; fatty acid salts; fatty acid esters; hydrocarbon waxes such as paraffin wax, phosphoric acid esters, polyethylene waxes, and polypropylene waxes; chemically modified polyolefin waxes; ester waxes such as carnauba wax; glycerin esters such as glycerol mono- and di-stearates; talc; microcrystalline silica; and acrylic copolymers (for example, PARALOID® K175 available from Rohm & Haas). Typically, the additive comprises one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate.

Another additive which may be used comprises a fatty acid or a salt of a fatty acid containing more than 18 carbon atoms and (ii) an ester wax comprising a fatty acid residue containing more than 18 carbon atoms and an alcohol residue containing from 2 to about 28 carbon atoms. The ratio of the fatty acid or salt of a fatty acid to the ester wax may be 1:1 or greater. In this embodiment, the combination of the fatty acid or fatty acid salt and an ester wax at the above ratio gives the additional benefit of providing a film or sheet with a haze value of less than 5%. The additives with fatty acid components containing 18 or less carbon atoms In the calendering process, higher molecular weight plasticizers are preferred to prevent smoking and loss of plasticizer during the calendering process. The preferred range of plasticizer content will depend on the properties of the base polyester and the plasticizer. In particular, as the Tg of the polyester as predicted by the well-known Fox equation (T. G. Fox, Bull. Am. Phys. Soc., 1, 123 (1956)) decreases, the amount of plasticizer needed to obtain a polymer blend that may be calendered satisfactorily also decreases. Typically, the plasticizer comprises from about 5 to about 50 weight percent (weight percent) of the polymer blend based on the total weight of the polymer blend. Other examples of plasticizer levels are about 10 to about 40 weight percent, about 15 to about 40 weight percent, and about 15 to about 30 weight percent of the polymer blend.

Our invention also includes a process for the manufacture of film or sheet, comprising any of the polymer blends of the invention. In some embodiments, a process is disclosed for making such articles, film, sheet, and/or fibers comprising the steps of injection molding, extrusion blow molding, film/sheet extruding or calendering the polymer blend(s) of the invention.

The present invention is illustrated in greater detail by the specific examples presented below. It is to be understood that these examples are illustrative embodiments and are not intended to be limiting of the invention, but rather are to be construed broadly within the scope and content of the appended claims.

EXAMPLES

The polymer blends provided by the present invention and the preparation thereof, including the preparation of representative polyesters, are further illustrated by the following examples.

The inherent viscosity of the polyesters was determined in 60/40 (wt/wt) phenol/tetrachloroethane at a concentration of 0.5 g/100 mL at 25° C. The glass transition temperatures (Tg's) were determined using a TA Instruments 2950 differential scanning calorimeter (DSC) at a scan rate of 20° C./min. The glycol content of the polyester portion of these blends was determined by proton nuclear magnetic resonance spectroscopy (NMR). Clarity was determined visually. Diffuse Transmission was determined by a HunterLab UltraScan Sphere 8000 using Hunter's Universal Software. The miscibility of the blends was determined by differential scanning calorimetry and by observation of the clarity of pressed films and molded objects.

The preparation of polycarbonates is well known in the art. See U.S. Pat. Nos. 3,030,335 and 3,317,466. The bisphenol A polycarbonate used was LEXAN, available from the General Electric Company or MAKROLON 2608, available from Beyer, Inc. For all examples MAKROLON 2608 was used. The PCTG used is grade Eastar PCTG Copolyester 5445 from Eastman Chemical Company and is consisting of terephthalic acid, CHDM, and EG where the mol % CHDM in the copolyester based on total glycol content is 62%.

The polyester portion of the present invention can be made by processes known from the literature such as, for example, by processes in homogeneous solution, by transesterification processes in the melt and by two phase interfacial processes. Suitable methods include the steps of reacting one or more dicarboxylic acids with one or more glycols at a temperature of about 100° C. to 315° C. at a pressure of about 0.1 to 760 mm Hg for a time sufficient to form a polyester. See U.S. Pat. No. 3,772,405 for methods of producing polyesters.

Heat Deflection Temperature (HDT), at 455 kilopascals (about 66 psi), was determined according to ASTM D648. Notched and Unnotched Izod Impact Strength was determined at 23° C. according to ASTM D256. Flexural Modulus (Flex Modulus) and flexural strength were determined according to ASTM D790. Tensile properties were determined according to ASTM D638. Visual clarity refers to the visual appearance of the injection molded test bars; Flex Modulus, D790 Yield Stress, Break Stress and D638 Yield Stress values are given in Mpa; D790 Yield Stress, Break Stress and D638 Yield Stress values are percentages; HDT is given in ° C.; Notched and Unnotched Izod values are given in foot pounds per inch (53 Joules per meter=1 foot pound per inch); and Enrgy/Vol@Break values are given in Mpa and refers to the total area under the stress strain curve and is a measure of toughness. Diffuse transmission is obtained by placing a light trap on the other side of the integrating sphere from where the sample port is, thus eliminating the straight-thru light path. Only light scattered by greater than 2.5 degrees is measured. Total transmission includes measurement of light passing straight-through the sample and also off-axis light scattered to the sensor by the sample. The sample is placed at the exit port of the sphere so that off-axis light from the full sphere interior is available for scattering. Refractive indices were measured on polymer films using a refractometer. Inherent viscosity (IV) and glass transition temperature (Tg) were measured as described herein.

The copolyesters used in these examples listed in Table 1 consist of: Terephthalic acid, ethylene glycol (EG), and 1,4-cyclohexanedimethanol (CHDM). The copolyesters listed in Table 1 were then blended with bisphenol A polycarbonate, PCTG and a phosphorous additive in the ratios shown in Table 2. The copolyesters were dried at 80° C. and the bisphenol A polycarbonate were dried at 100° C. overnight. The phosphorous concentrate was prepared by first hydrolyzing Weston 619 buy melting it and soaking it in water, allowing the excess water to evaporate. A powdered version MAKRALON 2608 is then added to the now hydrolyzed molten Weston 619 and mixed until it a homogeneous solution is formed. This material is then extruded in a twin-screw extruder at 280° C. and pelletized. The final phosphorous content in the pellets is 5 wt %.

The 25 weight (wt)% of each of the copolyesters in Table 1 and 2 weight % of the phosphorous additive contained in polycarbonatee were blended with additional bisphenol A polycarbonate and PCTG in a Werner Pfleider 30 mm twin-screw extruder equipped with moderate mixing screws at 270° C. These blends were then dried again overnight at 80° C. and then injection molded into flex and tensile bars at 270° C. on a Toyo 90 injection molding machine. The differential light transmission for each blend is shown in Table 2.

TABLE 1

| Example | Copolyester | mol % CHDM in copolyester | Refractive Index |
|---|---|---|---|
| 1 | Commercial copolyester 1 | 1.5 | 1.5708 |
| 2 | Commercial copolyester 2 | 4.5 | 1.5696 |
| 3 | Commercial copolyester 3 | 12 | 1.5672 |
| 4 | Commercial copolyester 4 | 31 | 1.5644 |
| 5 | PC 2608 | — | 1.5807 |
| 6 | PCTG 5445 | — | 1.5573 |

TABLE 2

| Example | Copolyester | wt % PCTG | wt % PC | wt % PCTG in PC | Total Transmission(%) |
|---|---|---|---|---|---|
| 7 | Commercial copolyester 1 | 37.5 | 35.5 | 50 | 83.27 |
| 8 | Commercial copolyester 1 | 33.75 | 39.25 | 45 | 81.76 |
| 9 | Commercial copolyester 1 | 41.25 | 31.75 | 55 | 84.46 |
| 10 | Commercial copolyester 1 | 45 | 28 | 60 | 84.86 |
| 11 | Commercial copolyester 1 | 46.875 | 26.125 | 62.5 | 84.65 |
| 12 | Commercial copolyester 1 | 48.75 | 24.25 | 65 | 84.61 |
| 13 | Commercial copolyester 1 | 45 | 28 | 60 | 81.85 |
| 14 | Commercial copolyester 1 | 48.75 | 24.25 | 65 | 82.04 |
| 15 | Commercial copolyester 1 | 52.5 | 20.5 | 70 | 80.91 |

TABLE 2-continued

| Example | Copolyester | wt % PCTG | wt % PC | wt % PCTG in PC | Total Transmission(%) |
|---|---|---|---|---|---|
| 16 | Commercial copolyester 1 | 56.25 | 16.75 | 75 | 79.50 |
| 17 | Commercial copolyester 2 | 37.5 | 35.5 | 50 | 84.43 |
| 18 | Commercial copolyester 2 | 41.25 | 31.75 | 55 | 84.96 |
| 19 | Commercial copolyester 2 | 45 | 28 | 60 | 85.09 |
| 20 | Commercial copolyester 2 | 48.75 | 24.25 | 65 | 85.44 |
| 21 | Commercial copolyester 2 | 48.75 | 24.25 | 65 | 84.96 |
| 22 | Commercial copolyester 2 | 48.75 | 24.25 | 65 | 83.83 |
| 23 | Commercial copolyester 2 | 45 | 28 | 60 | 83.14 |
| 24 | Commercial copolyester 2 | 52.5 | 20.5 | 70 | 83.15 |
| 25 | Commercial copolyester 2 | 56.25 | 16.75 | 75 | 82.30 |
| 26 | Commercial copolyester 3 | 37.5 | 35.5 | 50 | 75.44 |
| 27 | Commercial copolyester 3 | 33.75 | 39.25 | 45 | 73.22 |
| 25 | Commercial copolyester 3 | 30 | 43 | 40 | 70.80 |
| 29 | Commercial copolyester 3 | 26.25 | 46.75 | 35 | 68.66 |
| 30 | Commercial copolyester 3 | 37.5 | 35.5 | 50 | 75.68 |
| 31 | Commercial copolyester 3 | 45 | 28 | 60 | 79.50 |
| 32 | Commercial copojyester 3 | 52.5 | 20.5 | 70 | 83.88 |
| 33 | Commercial copolyester 3 | 56.25 | 16.75 | 75 | 85.05 |
| 34 | Commercial copolyester 3 | 60 | 13 | 80 | 85.54 |
| 35 | Commercial copolyester 3 | 63.75 | 9.25 | 85 | 85.52 |
| 36 | Commercial copolyester 3 | 67.5 | 5.5 | 90 | 85.88 |
| 37 | Commercial copolyester 3 | 71.25 | 1.75 | 95 | 85.78 |
| 38 | Commercial copolyester 4 | 26.25 | 46.75 | 35 | 74.96 |
| 39 | Commercial copolyester 4 | 30 | 43 | 40 | 76.72 |
| 40 | Commercial copolyester 4 | 22.5 | 50.5 | 30 | 73.16 |
| 41 | Commercial copolyester 4 | 18.75 | 54.25 | 25 | 68.51 |
| 42 | Commercial copolyester 4 | 30 | 43 | 40 | 75.68 |
| 43 | Commercial copolyester 4 | 37.5 | 35.5 | 50 | 82.89 |
| 44 | Commercial copolyester 4 | 45 | 28 | 60 | 85.50 |
| 45 | Commercial copolyester 4 | 52.5 | 20.5 | 70 | 85.43 |
| 46 | Commercial copolyester 4 | 56.25 | 16.75 | 75 | 85.40 |
| 47 | Commercial copolyester 4 | 60 | 13 | 80 | 85.35 |
| 48 | Commercial copolyester 4 | 63.75 | 9.25 | 85 | 85.99 |
| 49 | Commercial copolyester 4 | 67.5 | 5.5 | 90 | 85.95 |
| 50 | Commercial copolyester 4 | 71.25 | 1.75 | 95 | 86.10 |

PCTG is PCTG 5445 and PC is Makrolon 2608 bisphenol A polycarbonate.

The mechanical properties of selected miscible PCTG/PC blend and its refractive index matched blend with copolyester is shown in Table 3.

TABLE 3

| Test | Conditions | Property | Example 42 PCTG/PC 50/50 | Example 43 Copolyester 2 + 35.5 wt % PCTG + 37.5 PC |
|---|---|---|---|---|
| HDT | 66 psi | T [° C.] | 102 | 99 |
| Izod | 23° C., Notch | % Complete | 100 | 100 |
| | | EnergyAvgAllModes [ft-lb/in] | 2 | 1.2 |
| | | EnergyC [ft-lb/in] | 2 | 1.2 |
| | 23° C., UnNch | % NoBreak | 100 | 100 |
| | | EnergyAvgAllModes [ft-lb/in] | 63 | 60 |
| | | EnergyN [ft-lb/in] | 63 | 60 |
| Tnsl-D638 | 23° C., Large-I, NoExt | Enrgy/Vol @Brk [lb/in^2] | 8,709 | 8400 |
| | | YldStrn [%] | 6 | 6 |
| | | YldStrs [psi] | 8,147 | 8503 |

PCTG is PCTG 5445 and PC is Makrolon 2608 bisphenol A polycarbonate.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A polymer composition comprising:
   (A) a first component comprising about 1 to 99 percent by weight at least one polyester (A) comprising:
      (1) diacid residues selected from the group consisting of terephthalic acid residues, isophthalic acid residues and mixtures thereof, and
      (2) diol residues selected from the group consisting of 1,4-cyclohexanedimethanol residues, ethylene glycol residues and mixtures thereof;
      wherein the molar ratio of 1,4-cyclohexanedimethanol to ethylene glycol is less than 0.50;
   (B) a second component comprising about 99 to 1 percent by weight of a miscible blend of:
      (1) at least one polycarbonate (B) of bisphenol A
      (2) at least one polyester (C) comprising
         (a) diacid residues selected from the group consisting of terephthalic acid residues, isophthalic acid residues and mixture thereof, and (b) diol residues selected from the group consisting of 1,4-cyclohexanedimethanol residues, ethylene glycol residues, and mixtures thereof;
      wherein the molar ratio of 1,4-cyclohexanedimethanol to ethylene glycol is 0.50 or greater; and,
      (3) optionally, at least one salt (D) prepared by the reaction of one or more acidic phosphorus-containing compounds with one or more basic organic compounds which contain nitrogen;
   wherein the total weight percent for the first component and for the second component is equal to 100 weight percent; and
   wherein the total weight percent for the second component of polycarbonate (B) and polyester (C) is equal to 100 weight percent; and wherein the first component and second component have refractive indices which differ in absolute value by 0.008 or less; and wherein the total mole percent of the diacid residues of each of polyesters (A) and polyester (C) individually is equal to 100 mole percent; and wherein the total mole percent of the diol residues of each of polyesters (A) and polyester (C) individually is equal to 100 mole percent.

2. A polymer composition according to claim 1 wherein the diacid and diol residues of polyester (A) consist essentially of:
   (1) diacid residues comprising about 80 to 100 mole percent of terephthalic acid residues and 0 to about 20 mole percent isophthalic acid residues; and
   (2) diol residues comprising about 20 to 40 mole percent 1,4-cyclohexanedimethanol residues and about 80 to 60 mole percent alkylene glycol residues other than 1,4-cyclohexanedimethanol residues.

3. A polymer composition according to claim 1 wherein the polyester (A) comprises about 80 to 100 mole percent of terephthalic acid residues.

4. A polymer composition according to claim 3 wherein the polyester (A) comprises about 90 to 100 mole percent of terephthalic acid residues.

5. A polymer composition according to claim 1 wherein the polyester (A) comprises about 0.5 to 35 mole percent of 1,4-cyclohexanedimethanol residues.

6. A polymer composition according to claim 5 wherein the polyester (A) comprises about 27 to 35 mole percent of 1,4-cyclohexanedimethanol.

7. A polymer composition according to claim 1 wherein polyester (A) comprises about 0.5 to 13 mole percent of 1,4-cyclohexanedimethanol.

8. A polymer composition according to claim 1 wherein polyester (A) comprises 90 to 100 mole percent of ethylene glycol residues and 90 to 100 mole percent terephthalic acid residues.

9. A polymer composition according to claim 8 wherein polyester (A) comprises 95 to 100 mole percent of ethylene glycol residues and the diacid residues comprise 95 to 100 mole percent terephthalic acid residues.

10. A polymer composition according to claim 9 wherein polyester (A) comprises 100 mole percent of ethylene glycol residues and 100 mole percent terephthalic acid residues.

11. A polymer composition according to claim 1 wherein polyester (C) comprises 50 to 85 mole percent 1,4-cyclohexanedimethanol residues and 15 to 50 mole percent ethylene glycol residues.

12. A polymer composition according to claim 11 wherein polyester (C) comprises 55 to 70 mole percent 1,4-cyclohexanedimethanol residues and 30 to 45 mole percent ethylene glycol residues.

13. A polymer composition according to claim 12 wherein polyester (C) comprises 58 to 65 mole percent 1,4-cyclohexanedimethanol residues and 35 to 42 mole percent ethylene glycol residues.

14. A polymer composition according to claim 1 wherein the first component and second component have refractive indices which differ in absolute value by 0.006 or less.

15. A polymer composition according to claim 14 wherein the first component and second component have refractive indices which differ in absolute value by 0.004 or less.

16. A polymer composition comprising:
   (A) a first component comprising about 5 to 50 percent by weight at least one polyester (A) comprising:
       (1) diacid residues selected from the group consisting of terephthalic acid residues, isophthalic acid residues and mixtures thereof; and
       (2) diol residues selected from 1,4-cyclohexanedimethanol residues, ethylene glycol residues and mixtures thereof; and
       wherein the molar ratio of 1,4-cyclohexanedimethanol to ethylene glycol is less than 0.50;
   (B) a second component comprising about 50 to 95 percent by weight of a miscible blend of:
       (1) at least one polycarbonate (B) of bisphenol A
       (2) at least one polyester (C) comprising
           (a) diacid residues selected from the group consisting of terepthalic acid residues, isophthalic acid residues and mixtures thereof; and
           (b) diol residues selected from the group consisting of 1,4-cyclohexanedimethanol residues, ethylene glycol residues and mixtures thereof,
           wherein the molar ratio of 1,4-cyclohexanedimethanol to ethylene glycol is 0.50 or greater; and,
       (3) optionally, at least one salt (D) prepared by the reaction of one or more acidic phosphorus-containing compounds with one or more basic organic compounds which contain nitrogen;
   wherein the total weight percent for the first component and for the second component is equal to 100 weight percent;
   wherein the total weight percent for the second component of polycarbonate (B) and polyester (C) is equal to 100 weight percent;
   wherein the first component and second component have refractive indices which differ in absolute value by 0.008 or less;
   wherein the total mole percent of the diacid residues of each of polyesters (A) and polyester (C) individually is equal to 100 mole percent; and
   wherein the total mole percent of the diol residues of each of polyesters (A) and polyester (C) individually is equal to 100 mole percent.

17. A polymer composition according to claim 16 wherein the total weight percent of the first component is from about 10 to about 40 weight percent and the total weight percent of the second component is from about 60 to about 90 weight percent.

18. A polymer composition according to claim 17 wherein the total weight percent of the first component is from about 20 to about 35 weight percent and the total weight percent of the second component is from about 65 to about 80 weight percent.

19. A polymer composition comprising:
   (A) a first component comprising about 10 to 40 percent by weight at least one polyester (A) comprising (1) 80 to 100 mole percent of terephthalic acid residues and 0 to 20 mole percent of isophthalic acid; and (2) 0 to 35 mole percent of 1,4-cyclohexanedimethanol residues and 65 to 100 mole percent of ethylene glycol residues;
   (B) a second component comprising about 60 to 90 percent by weight of a blend of:
       (1) at least one polycarbonate (B) of bisphenol A
       (2) at least one polyester (C) comprising 50 to 85 mole percent 1,4-cyclohexanedimethanol residues and 15 to 50 mole percent ethylene glycol residues;
       (3) optionally, at least one salt (D) prepared by the reaction of one or more acidic phosphorus-containing compounds with one or more basic organic compounds which contain nitrogen;

wherein the total weight percent for the first component and for the second component is equal to 100 weight percent;

wherein the total weight percent for the second component of polycarbonate (B) and polyester (C) is equal to 100 weight percent; and wherein the first component and second component have refractive indices which differ in absolute value by 0.008 or less;

wherein the total mole percent of the diacid residues of each of polyesters (A) and polyester (C) individually is equal to 100 mole percent; and wherein the total mole percent of the diol residues of each of polyesters (A) and polyester (C) individually is equal to 100 mole percent.

20. A polymer composition according to claim 16 comprising:

(A) a first component comprising about 5 to 50 percent by weight at least one polyester (A) comprising:
(1) diacid residues comprising about 95 to 99.9 mole percent of terephthalic acid residues, and 0.1 to 5 mole percent of isophthalic acid residues; and
(2) diol residues comprising about 0.5 to 35 mole percent of 1,4-cyclohexanedimethanol residues and 65 to 99.5 mole percent of ethylene glycol residues; and (B) a second component comprising about 50 to 95 percent by weight of a miscible blend of:
(1) at least one polycarbonate (B) of bisphenol A;
(2) at least one polyester (C) comprising 50 to 85 mole percent 1,4-cyclohexanedimethanol residues and 15 to 50 mole percent ethylene glycol residues;
(3) optionally, at least one salt (D) prepared by the reaction of one or more acidic phosphorus-containing compounds with one or more basic organic compounds which contain nitrogen;

wherein the total weight percent of the first component and the second component is equal to 100 weight percent;

wherein the total weight percent for the second component of polycarbonate (B) and polyester (C) is equal to 100 weight percent;

wherein the first component and second component have refractive indices which differ in absolute value by 0.006 or less;

wherein the total mole percent of the diacid residues of each of polyesters (A) and polyester (C) individually is equal to 100 mole percent; and wherein the total mole percent of the diol residues of each of polyesters (A) and polyester (C) individually is equal to 100 mole percent.

21. A polymer composition according to claim 20 wherein the total weight percent of the first component is from about 10 to about 40 weight percent and the total weight percent of the second component is from about 60 to about 90 weight percent.

22. A polymer composition according to claim 21 wherein the total weight percent of the first component is from about 20 to about 35 weight percent and the total weight percent of the second component is from about 65 to about 80 weight percent.

23. A polymer composition according to claims 1, 16 or 19 wherein polyester (A) has an inherent viscosity (I.V.) of about 0.3 to 1.2 dL/g as determined at 25° C. using 0.50 gram of polymer per 100 mL of a solvent composed of 60 weight percent phenol and 40 weight percent tetrachloroethane.

24. A polymer composition according to claims 1, 16 or 19 wherein polyester (C) has an inherent viscosity (I.V.) of at least 0.5 dL/g as determined at 25° C. using 0.50 gram of polymer per 100 mL of a solvent composed of 60 weight percent phenol and 40 weight percent tetrachloroethane.

25. A polymer composition according to claim 24 wherein polyester (C) has an inherent viscosity (I.V.) of at least 0.7 dL/g as determined at 25° C. using 0.50 gram of polymer per 100 mL of a solvent composed of 60 weight percent phenol and 40 weight percent tetrachloroethane.

26. A polymer composition according to claims 1, 16 or 19 wherein polycarbonate (B) has an inherent viscosity (I.V.) of at least 0.3 dL/g as determined at 25° C. using 0.50 gram of polymer per 100 mL of a solvent composed of 60 weight percent phenol and 40 weight percent tetrachloroethane.

27. A polymer composition according to claim 26 wherein polycarbonate (B) has an inherent viscosity (I.V.) of at least 0.5 dL/g as determined at 25° C. using 0.50 gram of polymer per 100 mL of a solvent composed of 60 weight percent phenol and 40 weight percent tetrachloroethane.

28. A polymer composition according to claims 1, 16 or 19 wherein the first component and second component have refractive indices which differ in absolute value by 0.006 or less.

29. A polymer composition according to claims 1, 16 or 19 wherein the first component and second component have refractive indices which differ in absolute value by 0.004 or less.

30. The polymer composition of claim 1, 16 or 19 wherein the acidic phosphorus-containing compounds of salt (D) are selected from the group of consisting of compounds having the formulas:

(1)

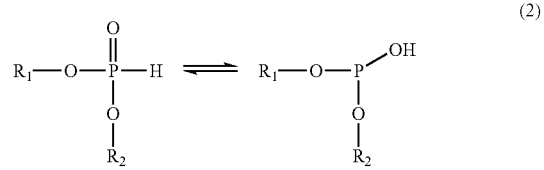

(2)

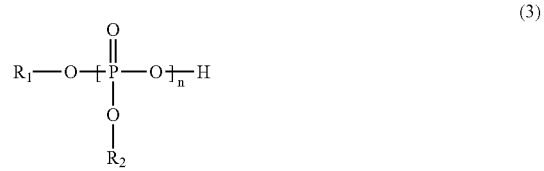

(3)

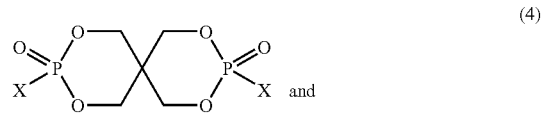

(4) and

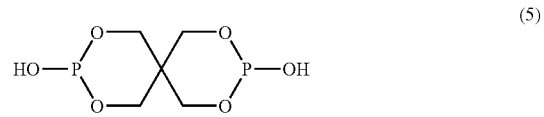

(5)

wherein

R₁ and R₂ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

n is 2 to 500; and

X is selected from the group consisting of hydrogen and hydroxy;

and wherein the basic organic compounds are selected from the group consisting of compounds having the formulas:

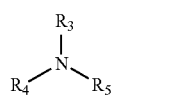

(1)

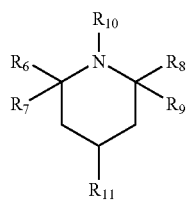

(2)

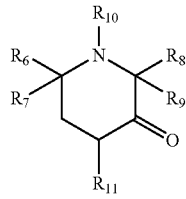

(3)

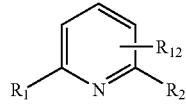

(4)

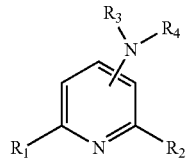

(5)

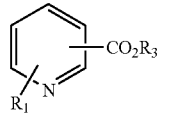

(6)

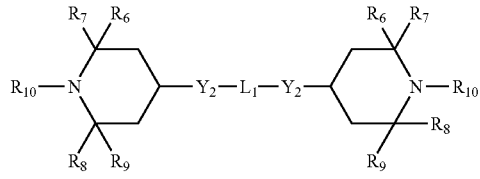

(7)

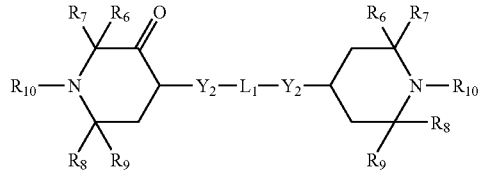

(8)

-continued

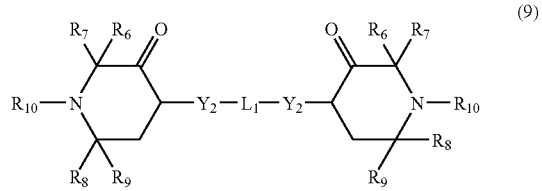

(9)

(10)

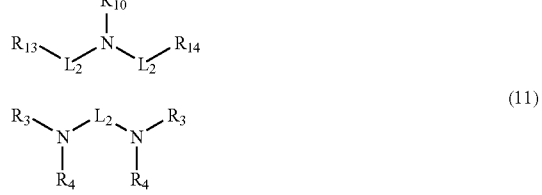

(11)

(12)

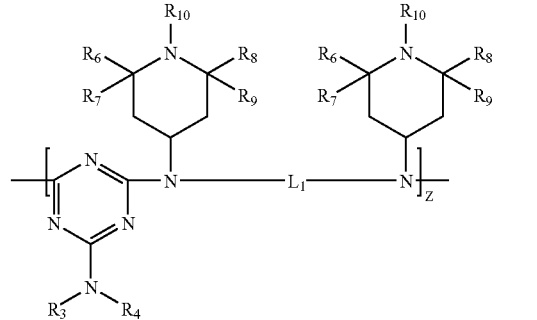

(13)

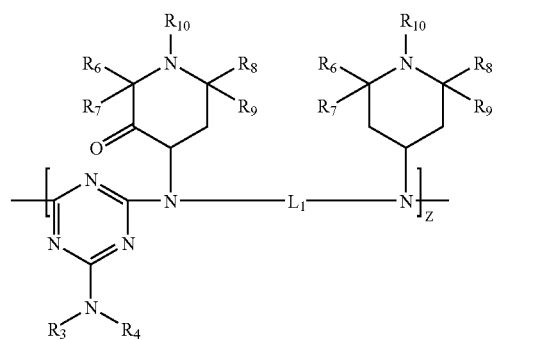

(14)

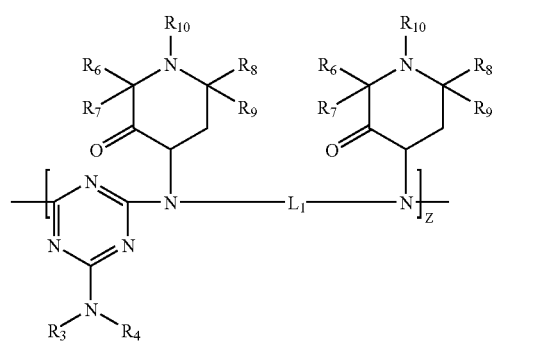

(15)

-continued

(16)
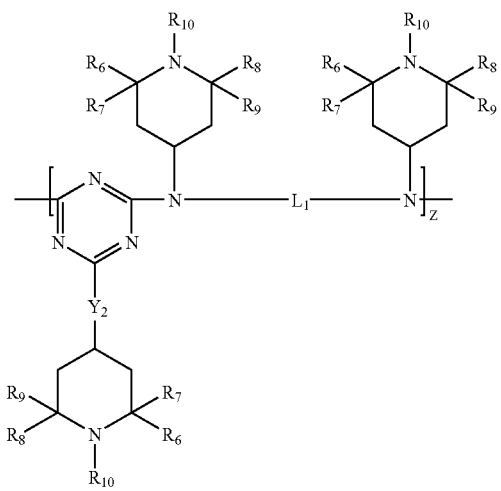

(17)
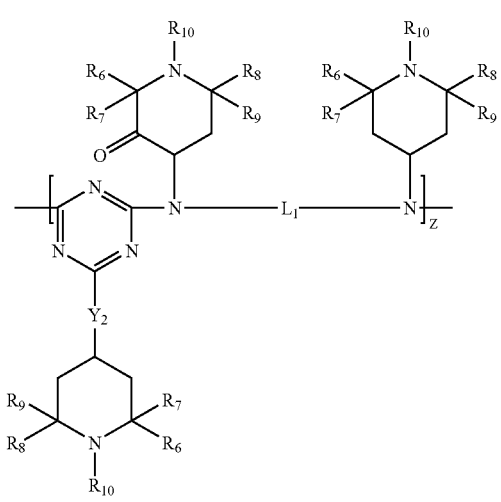

(18)
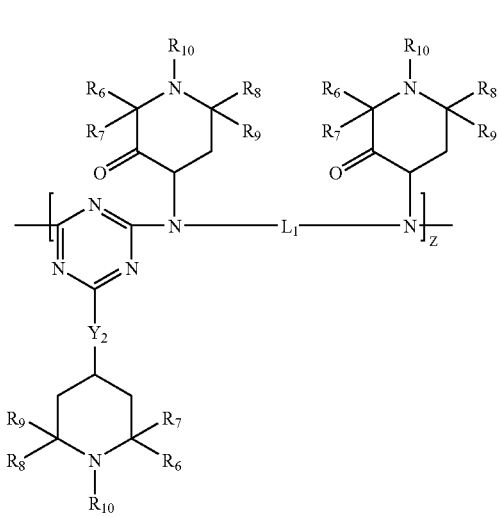

-continued

(19)
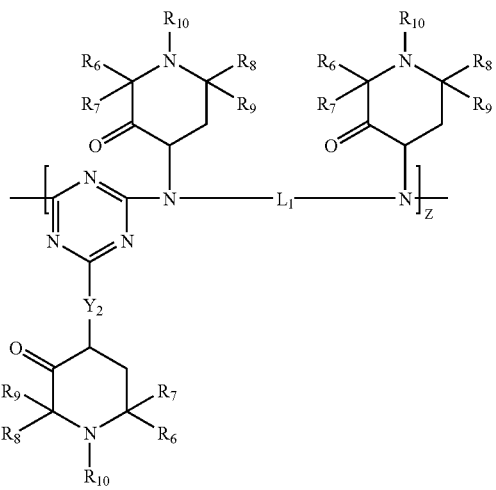

(20)
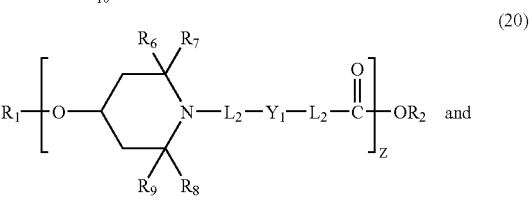 and

(21)
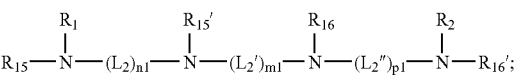

wherein
$R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$, $R_4$, and $R_5$ is a substituent other than hydrogen; $R_3$ and $R_4$ or $R_4$ and $R_5$ collectively may represent a divalent group forming a ring with the nitrogen atom to which they are attached, e.g., morpholino, piperidino and the like;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;

$R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen; $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

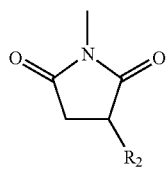

$R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 2, 3 or 4 positions on the aromatic ring;

the —N($R_3$)($R_4$) group may be located at the 2, 3 or 4 positions on the pyridine ring of nitrogen compound (5);

the —$CO_2R_3$ and $R_1$ groups may be located at any of the 2, 3, 4, 5, 6 positions of the pyridine ring of nitrogen compound (6);

$L_1$ is a divalent linking group selected from $C_2$-$C_{22}$-alkylene; —($CH_2CH_2$—$Y_1$)$_{1-3}$—$CH_2CH_2$—; $C_3$-$C_8$-cycloalkylene; arylene; or —CO-$L_2$-OC—;

$L_2$, $L_2'$ and $L_2''$ are independently selected from $C_1$-$C_{22}$-alkylene, arylene, —($CH_2CH_2$—$Y_1$)$_{1-3}$—$CH_2CH_2$— and $C_3$-$C_8$-cycloalkylene;

$Y_1$ is selected from —OC(O)—, —NHC(O)—, —O—, —S—, —N($R_1$)—;

$Y_2$ is selected from —O— or —N($R_1$)—;

$R_{13}$ and $R_{14}$ are independently selected from —O—$R_2$, and —N($R_2$)$_2$;

Z is a positive integer of up to about 20, preferably up to about 6;

m1, n1 and p1 are independently selected from 1 to about 12;

$R_{15}$, $R_{15}'$, $R_{16}$ are $R_{16}'$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

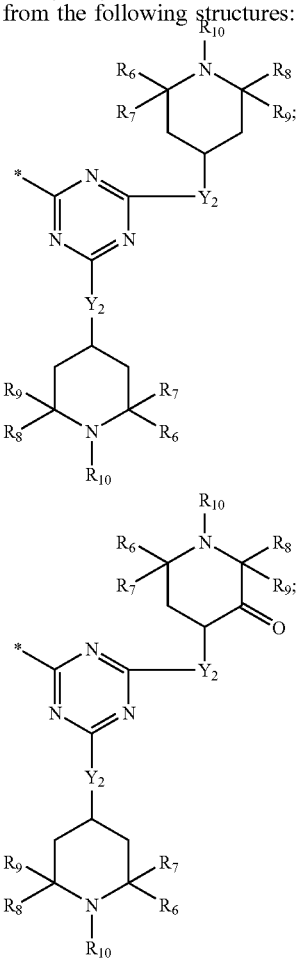

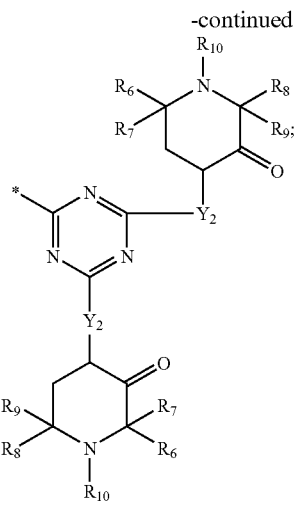

wherein * of the Radical A structures designates the position of attachment;

and wherein the ratio of the number of phosphorus atoms in the acidic phosphorus-containing compound to number of basic nitrogen atoms in the basic organic compound is about 0.05 to about 2.

31. The polymer composition of claim 30 wherein salt (D) is present in said polymer composition in the amount of about 0.01 to about 0.25 weight percent based on the total weight of the composition of at least one salt prepared by the reaction of phosphorous acid, with one or more basic organic compounds which contain nitrogen and have one of the following formulas:

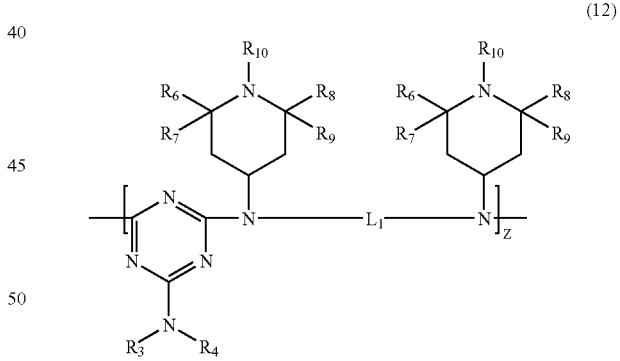
(12)

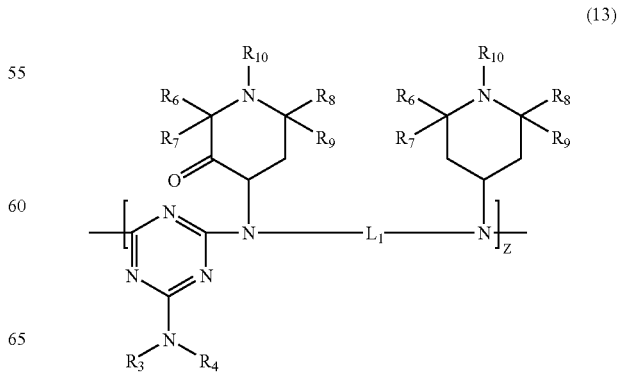
(13)

-continued

(14)
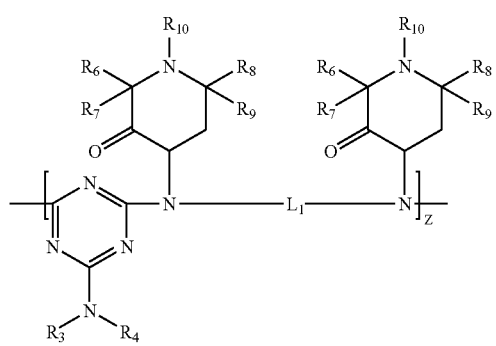

(15)
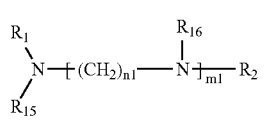

(16)
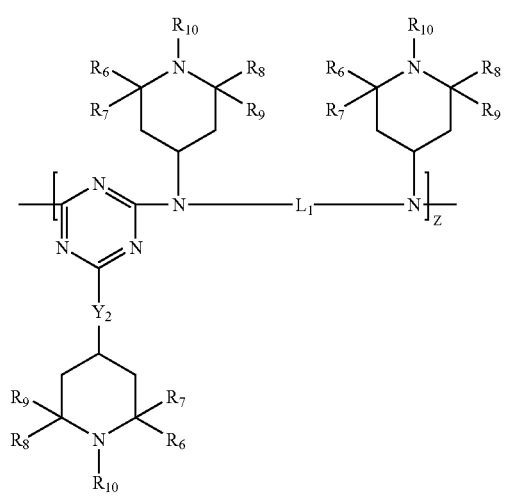

(17)
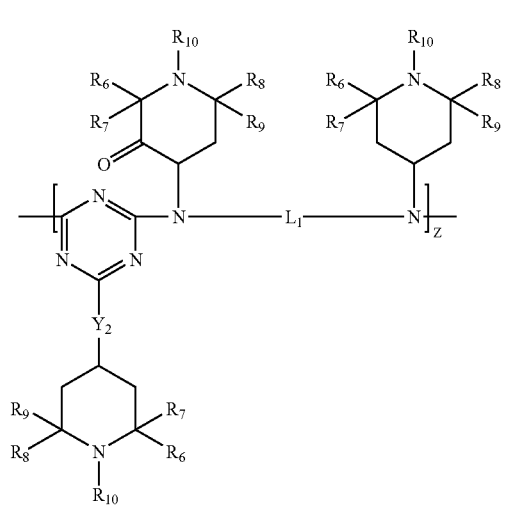

-continued

(18)
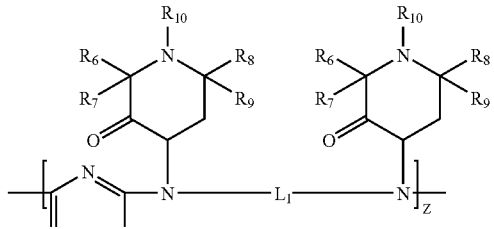

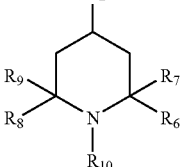

(19)
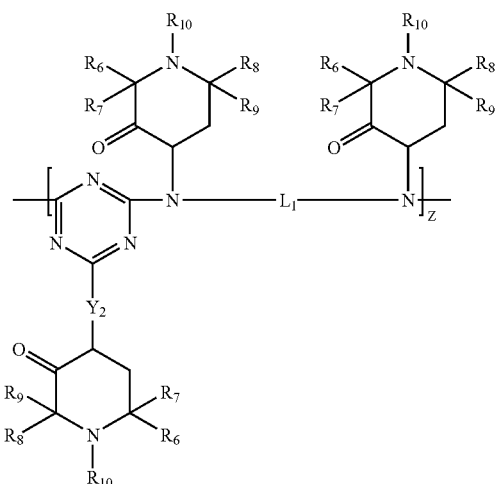

(20)
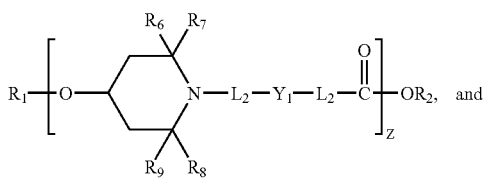 and

(21)
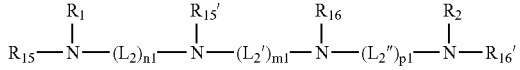

wherein $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$, $R_4$, and $R_5$ is a substituent other than hydrogen; $R_3$ and $R_4$ or $R_4$ and $R_5$ collectively may represent a divalent group forming a ring with the nitrogen atom to which they are attached, e.g., morpholino, piperidino and the like;

$R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;

$R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;

$R_{11}$ is selected from hydrogen; $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

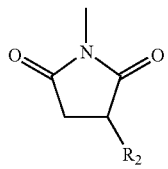

$R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 2, 3 or 4 positions on the aromatic ring;

the —$N(R_3)(R_4)$ group may be located at the 2, 3 or 4 positions on the pyridine ring of nitrogen compound (5);

the —$CO_2R_3$ and $R_1$ groups may be located at any of the 2, 3, 4, 5, 6 positions of the pyridine ring of nitrogen compound (6);

$L_1$ is a divalent linking group selected from $C_2$-$C_{22}$-alkylene; —$(CH_2CH_2$—$Y_1)_{1-3}$—$CH_2CH_2$—; $C_3$-$C_8$-cycloalkylene; arylene; or —$CO$-$L_2$-$OC$—;

$L_2$, $L_2'$ and $L_2''$ are independently selected from $C_1$-$C_{22}$-alkylene, arylene, —$(CH_2CH_2$—$Y_1)_{1-3}$—$CH_2CH_2$13 and $C_3$-$C_8$-cycloalkylene;

$Y_1$ is selected from —$OC(O)$—, —$NHC(O)$—, —$O$—, —$S$—, —$N(R_1)$—;

$Y_2$ is selected from —$O$— or —$N(R_1)$—;

$R_{13}$ and $R_{14}$ are independently selected from —$O$—$R_2$, and —$N(R_2)_2$;

Z is a positive integer of up to about 20, preferably up to about 6;

m1, n1 and p1 are independently selected from 1 to about 12;

$R_{15}$, $R_{15}'$, $R_{16}$ are $R_{16}'$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

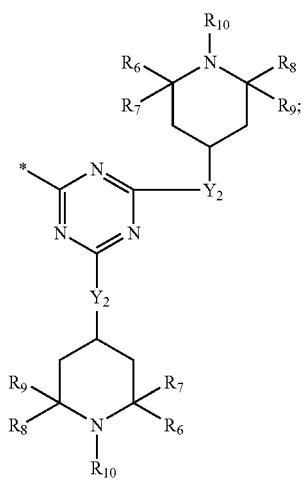

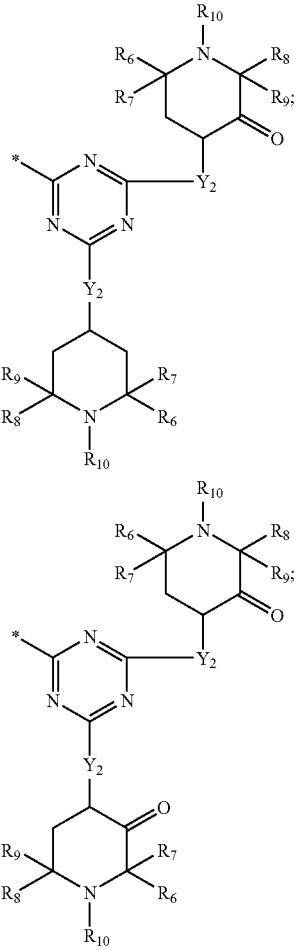

wherein * of the Radical A structures designates the position of attachment;

wherein at least one of $R_{15}$ and $R_{16}$ represents an A radical; and the ratio of the number of phosphorus atoms in the acidic phosphorus-containing compound to number of basic nitrogen atoms in the basic organic compound is about 0.05 to about 2.

32. The polymer composition of claim 31 wherein salt (D) is present in said polymer composition in the amount of about 0.01 to about 0.25 weight percent based on the total weight of the composition of at least one salt prepared by the reaction of phosphorous acid, with a basic organic compound having the formula:

(12)

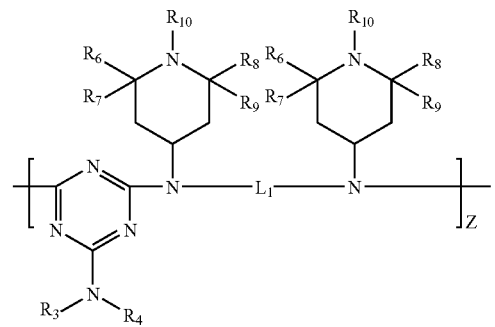

wherein

- $R_3$ and $R_4$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ collectively represent a divalent group forming a ring with the nitrogen atom to which they are attached;
- $R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_{10}$ is selected from the group consisting of hydrogen and $C_1$-$C_{22}$-alkyl;
- $L_1$ is a divalent linking group selected from the group consisting of $C_2$-$C_{22}$-alkylene, —($CH_2CH_2$—$Y_1)_{1-3}$—$CH_2CH_2$—, $C_3$-$C_8$-cycloalkylene, arylene, and —CO-$L_2$-OC—;
- $L_2$ is selected from $C_1$-$C_{22}$-alkylene, arylene, —($CH_2CH_2$—$Y_1)_{1-3}$—$CH_2CH_2$— and $C_3$-$C_8$-cycloalkylene;
- $Y_1$ is selected from the group consisting of —OC(O)—, —NHC(O)—, —O—, —S—, and —N($R_1$)—; and
- Z is a positive integer of up to about 6.

33. The polymer composition according to claim 32 wherein salt (D) comprises about 0.05 to about 0.15 weight percent based on the total weight of the composition and the ratio of the number of phosphorus atoms in the acidic phosphorus-containing compound to number of basic nitrogen atoms in the basic organic compound is about 0.25 to about 1.1.

34. A polymer composition according to claims 16 or 19 wherein the polyester (A) comprises about 80 to 100 mole percent of terephthalic acid residues.

35. A polymer composition according to claim 34 wherein the polyester (A) comprises about 90 to 100 mole percent of terephthalic acid residues.

36. A polymer composition according to claims 16 or 19 wherein the polyester (A) comprises about 0.5 to 35 mole percent of 1,4-cyclohexanedimethanol residues.

37. A polymer composition according to claim 36 wherein the polyester (A) comprises about 27 to 35 mole percent of 1,4-cyclohexanedimethanol.

38. A polymer composition according to claim 36 wherein polyester (A) comprises about 0.5 to 13 mole percent of 1,4-cyclohexanedimethanol.

39. A polymer composition according to claims 16 or 19 wherein polyester (A) comprises 95 to 100 mole percent of ethylene glycol residues and the diacid residues comprise 95 to 100 mole percent terephthalic acid residues.

40. A polymer composition according to claim 39 wherein polyester (A) comprises 100 mole percent of ethylene glycol residues and 100 mole percent terephthalic acid residues.

41. A polymer composition according to claims 16 or 19 wherein polyester (C) comprises 50 to 85 mole percent 1,4-cyclohexanedimethanol residues and 15 to 50 mole percent ethylene glycol residues.

42. A polymer composition according to claim 41 wherein polyester (C) comprises 55 to 70 mole percent 1,4-cyclohexanedimethanol residues and 30 to 45 mole percent ethylene glycol residues.

43. A polymer composition according to claim 42 wherein polyester (C) comprises 58 to 65 mole percent 1,4-cyclohexanedimethanol residues and 35 to 42 mole percent ethylene glycol residues.

44. The polymer composition of claims 1, 16 or 19 wherein polyester (A), polycarbonate (B) or polyester (C) comprise one or more branching agents comprising about 0.01 to about 10.0 weight percent, based on the total weight of the polymer.

45. The polymer composition of claim 44 containing one or more branching agents comprising about 0.05 to about 5 weight percent, based on the total weight of the polymer.

46. The polymer composition of claim 45 wherein said branching agents comprise about 0.01 to about 1 weight percent (wt %), based on the total weight of said polymer, of one or more residues of monomers having 3 or more carboxyl substituents, hydroxyl substituents, or a combination thereof.

47. The polymer composition of claim 44 wherein said branching agents comprise about 0.1 to about 0.7 mole percent of one or more residues of trimellitic anhydride, pyromellitic dianhydride, glycerol, sorbitol, 1,2,6-hexanetriol, pentaerythritol, trimethylolethane, or trimesic acid.

48. The polymer composition of claims 1, 16 or 19 further comprising one or more plasticizers.

49. The polymer composition of claims 1, 16 or 19 further comprising about 5 to about 40 weight %, based on the total weight of said polymer composition, of a flame retardant.

50. The polymer composition of claim 49 comprising one or flame retardants selected from the group consisting of phosphorous based compounds.

51. The polymer composition of claim 50 comprising one or more monoesters, diesters, or triesters of phosphoric acid.

52. The polymer composition of claims 1, 16 or 19 comprising a catalyst quencher.

53. A method of producing the polymer composition of claims 1, 16 or 19 which comprises the steps of:
   (a) blending said polycarbonate (B) and said polyester (C) to form the second component;
   (b) blending said first component with the second component;
   (c) before, during or after the blending of the first component with the second component, melting the first component and the second component to form after the blending and melting, a melt blend; and
   (d) cooling the melt blend to form a clear blend composition.

54. A method of producing the polymer composition of claims 1, 16 or 19 which comprises the steps of:
   (a) blending polyester (A), polycarbonate (B) and polyester (C) and, optionally, salt (D);
   (b) melting the blend of (a) to form after the blending and melting, a melt blend; and
   (d) cooling the melt blend to form a clear blend composition.

55. A process for the manufacture of film or sheet comprising the steps of extruding or calendering a polymer composition according to claims 1, 16 or 19.

56. A film or sheet comprising a polymer composition according to claims 1, 16 or 19.

57. A film or sheet according to claim 56 wherein said film or sheet was produced by extrusion or calendering.

58. A film or sheet according to claim 56 having at least 2 layers.

59. A film or sheet according to claim 58 wherein the first component and the second component are in separate layers.

60. A shaped article comprising a polymer composition according to claims 1, 16 or 19.

61. A shaped article according to claim 60 wherein said article was produced by injection molding or extrusion blow molding.

62. A shaped article according to claim 61 having a diffuse transmittance value of greater than about 40% or more as determined by ASTM Method D1003.

63. A shaped article according to claim 62 having a diffuse transmittance value of greater than about 60% or more as determined by ASTM Method D1003.

64. A shaped article according to claim 63 having a diffuse transmittance value of greater than about 80% or more as determined by ASTM Method D1003.

65. The shaped article of claim 60 which is a fiber, sheet, film, tube, bottle or profile.

* * * * *

UNITED STATES PATENT AND TRADEMARK OFFICE
CERTIFICATE OF CORRECTION

PATENT NO. : 7,226,985 B2 Page 1 of 1
APPLICATION NO. : 11/179428
DATED : June 5, 2007
INVENTOR(S) : Hale et al.

It is certified that error appears in the above-identified patent and that said Letters Patent is hereby corrected as shown below:

Column 49, Line 43, Claim 31 "$R_{16}$ are $R_{16}'$" should read --$R_{16}$ and $R_{16}'$--.

Signed and Sealed this

Seventh Day of August, 2007

JON W. DUDAS
*Director of the United States Patent and Trademark Office*